US012299343B2

(12) United States Patent
Wang

(10) Patent No.: US 12,299,343 B2
(45) Date of Patent: May 13, 2025

(54) DOUBLE-CHANNEL SCREEN MIRRORING METHOD AND ELECTRONIC DEVICE

(71) Applicant: Huawei Technologies Co., Ltd., Shenzhen (CN)

(72) Inventor: Shanshi Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/342,398

(22) Filed: Jun. 27, 2023

(65) Prior Publication Data

US 2023/0350629 A1 Nov. 2, 2023

Related U.S. Application Data

(63) Continuation of application No. PCT/CN2021/140200, filed on Dec. 21, 2021.

(30) Foreign Application Priority Data

Dec. 29, 2020 (CN) .......................... 202011614251.0

(51) Int. Cl.
*G06F 3/14* (2006.01)
*G06F 3/16* (2006.01)

(52) U.S. Cl.
CPC .............. *G06F 3/1454* (2013.01); *G06F 3/16* (2013.01)

(58) Field of Classification Search
CPC .......... G06F 3/1454; G06F 3/16; G06F 3/165; G06F 2203/04803; G09G 5/14; G09G 2340/0464; G09G 2356/00; H04N 21/4122; H04N 21/43615; H04N 21/43637; H04N 21/439; H04N 21/41265; H04N 7/183;

(Continued)

(56) References Cited

U.S. PATENT DOCUMENTS

2009/0149253 A1 6/2009 Kelly et al.
2014/0009394 A1* 1/2014 Lee .................. H04N 21/41407
345/157

(Continued)

FOREIGN PATENT DOCUMENTS

| CN | 108124173 A | 6/2018 |
| CN | 108932144 A | 12/2018 |
| CN | 111131866 A | 5/2020 |

*Primary Examiner* — Xuemei Zheng
(74) *Attorney, Agent, or Firm* — Conley Rose, P.C.

(57) ABSTRACT

A double-channel screen mirroring method includes receiving, from a first source device, first screen-mirroring data, receiving, from a second source device, second screen-mirroring data, wherein the first source device and the second source device have a first relative position relationship, displaying, based on the first screen-mirroring data, a first mirrored picture corresponding to the first source device in a first region of a display screen, displaying, based on the second screen-mirroring data, a second mirrored picture corresponding to the second source device in a second region of the display screen, wherein the first region and the second region have the first relative position relationship, and switching, when the first source device and the second source device change from the first relative position relationship to a second relative position relationship, the first region to displaying the second mirrored picture and the second region to displaying the first mirrored picture.

21 Claims, 16 Drawing Sheets

(58) Field of Classification Search
CPC .......... H04N 7/181; H04N 7/147; H04N 7/15; H04M 1/72412
See application file for complete search history.

(56) References Cited

U.S. PATENT DOCUMENTS

| | | | |
|---|---|---|---|
| 2015/0120817 A1* | 4/2015 | Jeong | G06F 3/1454 709/203 |
| 2020/0388248 A1* | 12/2020 | Kimata | G09G 3/20 |
| 2021/0149618 A1* | 5/2021 | Lee | G06F 3/16 |
| 2022/0408136 A1 | 12/2022 | Wang et al. | |

* cited by examiner

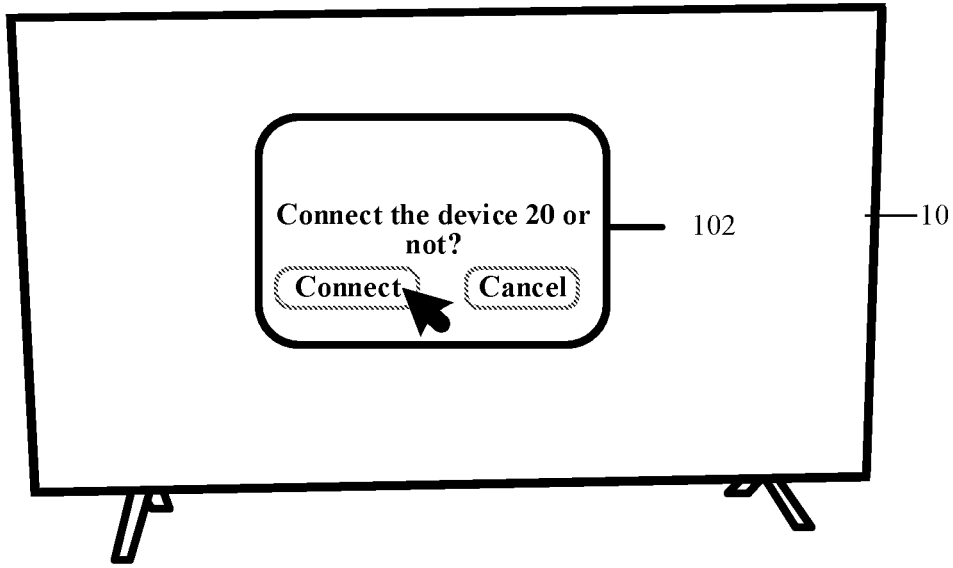

| An electronic device displays, based on first screen-mirroring data sent by a first source device and second screen-mirroring data sent by a second source device, a mirrored picture corresponding to the first source device in a first region of a display screen and displays a mirrored picture corresponding to the second source device in a second region of the display screen | ∽ 910 |

| When the first source device and the second source device change from a first relative position relationship to a second relative position relationship, the electronic device switches the first region to displaying the mirrored picture corresponding to the second source device and switches the second region to displaying the mirrored picture corresponding to the first source device | ∽ 920 |

```
┌─────────────────────────────────────────────────────────┐
│ An electronic device receives first screen-mirroring    │
│ data sent by a first source device and second           │──~ 1010
│ screen-mirroring data sent by a second source device    │
└─────────────────────────────────────────────────────────┘
                            │
┌─────────────────────────────────────────────────────────┐
│ Determine a relative position between the first source  │──~ 1020
│ device and the second source device                     │
└─────────────────────────────────────────────────────────┘
                            │
┌─────────────────────────────────────────────────────────┐
│ Display, based on the first screen-mirroring data, the  │
│ second screen-mirroring data, and the relative position │
│ between the first source device and the second source   │──~ 1030
│ device, a mirrored picture corresponding to the first   │
│ source device in a first region of a display screen and │
│ display a mirrored picture corresponding to the second  │
│ source device in a second region of the display screen  │
└─────────────────────────────────────────────────────────┘
                            │
┌─────────────────────────────────────────────────────────┐
│ When the first source device and the second source      │
│ device change from a first relative position            │
│ relationship to a second relative position              │
│ relationship, the electronic device switches the first  │──~ 1040
│ region to displaying the mirrored picture corresponding │
│ to the second source device and switches the second     │
│ region to displaying the mirrored picture corresponding │
│ to the first source device                              │
└─────────────────────────────────────────────────────────┘
```

FIG. 10

DOUBLE-CHANNEL SCREEN MIRRORING METHOD AND ELECTRONIC DEVICE

CROSS-REFERENCE TO RELATED APPLICATIONS

This is a continuation of International Patent Application No. PCT/CN2021/140200 filed on Dec. 21, 2021, which claims priority to Chinese Patent Application No. 202011614251.0 filed on Dec. 29, 2020. The disclosures of the aforementioned applications are hereby incorporated by reference in their entireties.

TECHNICAL FIELD

This disclosure relates to the field of electronic technologies, and in particular, to a double-channel screen mirroring method and an electronic device.

BACKGROUND

With development of electronic technologies and terminal products, interconnection and interworking between electronic devices in different scenarios, screen mirroring and application sharing between different electronic devices, and the like can be implemented. For example, a user may mirror a picture of a mobile phone to a large-screen device (for example, a television) such as a smart screen (which may be understood as an intelligent display device).

Currently, the smart screen may support double-channel screen mirroring through two mobile phones at the same time. This process may be referred to as "smart double mirroring". The smart double mirroring function may enable a user to obtain better entertainment experience. For example, in a home scenario, a user may use two mobile phones, and mirror pictures of the two mobile phones to the smart screen, to bring better visual experience to the user. Alternatively, during shopping, a user may compare prices through pictures corresponding to the two mobile phones on the smart screen. Alternatively, in a scenario in which users play a game, two users may mirror pictures of their respective mobile phones to the smart screen, to provide better game experience to the users. In a working scenario, a user may use the smart double mirroring function to mirror content of two mobile phones to a large-screen device in double channels, to facilitate sharing and comparison of working features.

During smart double mirroring, the user can mirror the pictures of the two mobile phones to the smart screen. When the user changes the left and right positions of the two mobile phones, the user needs to manually switch between the mirrored pictures on the smart screen by pressing a key on a remote control to change the positions of the mobile phone pictures displayed on the smart screen. The method for switching the double-channel screen mirrored picture is complex. Especially in a scenario such as a game battle of users, the users need to pause the game to complete switching of display positions of pictures, which reduces user experience.

SUMMARY

This disclosure provides a double-channel screen mirroring method and an electronic device. A scenario in which pictures respectively corresponding to two mobile phones are displayed on a smart screen through double-channel screen mirroring is used as an example. In the method, display positions of double-mirrored pictures on a display screen may be dynamically switched by the smart screen based on a position change of the mobile phones, so that the mirrored pictures of the two mobile phones can be adaptively switched with the positions of the mobile phones, a user operation is simplified, and interaction efficiency and interaction intelligence of a device are improved.

According to a first aspect, a double-channel screen mirroring method is provided. The method is applied to an electronic device including a display screen. The method includes: the electronic device displays, based on first screen-mirroring data sent by the first source device and second screen-mirroring data sent by the second source device, a mirrored picture corresponding to a first source device in a first region of the display screen and displays a mirrored picture corresponding to a second source device in a second region of the display screen. The first source device and the second source device have a first relative position relationship, and the first region and the second region also have the first relative position relationship. When the first source device and the second source device change from the first relative position relationship to a second relative position relationship, the electronic device switches the first region to displaying the mirrored picture corresponding to the second source device and switches the second region to displaying the mirrored picture corresponding to the first source device. The second relative position relationship is different from the first relative position relationship.

Optionally, a scenario in which two mobile phone pictures are displayed on the smart screen through double-channel screen mirroring is used as an example. The electronic device may be the smart screen, and the first source device and the second source device may be two to-be-mirrored mobile phones. It should be understood that types of the first source device, the second source device, and the electronic device are not limited in embodiments of this disclosure.

According to the foregoing method, the smart screen can dynamically switch between the double mirrored pictures on the display screen based on the position change of the mobile phones, and implement adaptive switching between the mirrored pictures of the two mobile phones based on the position change of the mobile phones. Audio play can also change with a change of a display region on the display screen, and a sound and picture can be switched simultaneously, thereby providing more user-friendly experience.

It should be understood that, before the foregoing method, the user may mirror the mirrored pictures of the two mobile phones to the smart screen in two channels in a plurality of implementations. For example, the user may install a smart screen application on the mobile phone, and implement an operation of connecting to the smart screen in different manners such as scanning a code or BLUETOOTH connection in the smart screen application. In addition, the user may activate the smart double mirroring function of the smart screen through a path of "Smart screen home page>General>Smart double mirroring>Smart double mirroring switch" on the smart screen. This is not limited in embodiments of this disclosure.

With reference to the first aspect, in some implementations of the first aspect, that the first source device and the second source device have the first relative position relationship, and the first region and the second region also have the first relative position relationship includes: in a first reference direction, the first source device is located on a left side of the second source device, and the first region is located on a left side of the second region; and that the first source device and the second source device have the second relative position relationship includes: in the first reference direction, the first source device is located on a right side of the second source device.

In a possible implementation, the electronic device, the first source device, and the second source device each include a positioning component, and the electronic device determines, based on the positioning components of the electronic device, the first source device, and the second source device, that the first source device and the second source device have the first relative position relationship or the second relative position relationship.

With reference to the first aspect and the foregoing implementations, in some implementations of the first aspect, the method further includes: the electronic device determines positions of the first source device and the second source device or a relative position relationship between the first source device and the second source device; and that the electronic device displays the mirrored picture corresponding to the first source device in the first region of the display screen and displays the mirrored picture corresponding to the second source device in the second region of the display screen based on the first screen-mirroring data sent by the first source device and the second screen-mirroring data sent by the second source device includes: the electronic device displays, based on the positions of the first source device and the second source device or the relative position relationship between the first source device and the second source device and the first screen-mirroring data and the second screen-mirroring data, the mirrored picture corresponding to the first source device in the first region of the display screen and displays the mirrored picture corresponding to the second source device in the second region of the display screen.

In a possible implementation, in embodiments of this disclosure, the "positions of the first source device and the second source device" determined by the electronic device may be that the first source device sends position information of the first source device to the electronic device, the second source device sends position information of the second source device to the electronic device, and the electronic device may determine, based on the position information of the first source device and the position information of the second source device, the first region for displaying the mirrored picture of the first source device and the second region for displaying the mirrored picture of the second source device. In this situation, the electronic device may not have a positioning component or the positioning component does not participate in the process.

For example, in a reference direction, the smart screen may determine positions of or a relative position relationship between two mobile phones (for example, the smart screen may determine positions of the two mobile phones or a relative position relationship between the two mobile phones by receiving signals or information from the mobile phones, for example, the two mobile phones may separately send their own position information to the smart screen, so that the smart screen can determine positions of the two mobile phones or relative position relationships between the two mobile phones based on the received information). For example, the first mobile phone is located on the left side of the second mobile phone. In this way, the smart screen determines that a region for displaying the mirrored picture of the first mobile phone is located on a left side of a region for displaying the mirrored picture of the second mobile phone.

In another possible implementation, the electronic device may detect the relative position relationship between the first source device and the second source device using hardware such as the positioning component of the electronic device, to determine the first region for displaying the mirrored picture of the first source device and the second region for displaying the mirrored picture of the second source device. In this situation, the electronic device may implement the process using the positioning component of the electronic device, the positioning component of the first source device, the positioning component of the second source device, and the like. It should be understood that this is not limited in embodiments of this disclosure. In an example, the smart screen may detect the positions of or the relative position relationship between the two mobile phones (for example, may detect the positions of or the relative position relationship between the two mobile phones through specific hardware and/or software in the smart screen, or may further detect the positions of or the relative position relationship between the two mobile phones through hardware and/or software in the two mobile phones).

For example, the two mobile phones may separately send ultrasonic waves, and the smart screen receives the ultrasonic waves sent by the two mobile phones using a microphone, to obtain a sound phase difference to determine the relative position relationship between the two mobile phones. If it is detected that a position relationship between a first mobile phone and a second mobile phone changes, for example, the first mobile phone changes from being located on a left side of the second mobile phone to being located on a right side of the second mobile phone. In embodiments of this disclosure, when the position relationship between the two mobile phones changes, the mirrored pictures displayed in two regions on the display screen of the smart screen that are respectively corresponding to the mirrored pictures corresponding to the two mobile phones may be automatically switched.

Alternatively, this is implemented based on a transmission capability of an indoor BLUETOOTH positioning technology. The BLUETOOTH positioning technology may use a radio technology of short-distance communication between mobile phones, and the electronic device and the two mobile phones may be used as BLUETOOTH gateways to implement positioning based on signal strength between the BLUETOOTH gateways. For example, two mobile phones send radio signals, and the electronic device separately receives radio information of the two mobile phones, and determines the relative position relationship between the two mobile phones based on the received radio signals.

Alternatively, the electronic device may determine a received signal strength indication (RSSI) between the electronic device and the two mobile phones through a WI-FI positioning technology, that is, based on WI-FI communication, and measure a distance between the electronic device and the two mobile phones based on the received signal strength, to perform positioning calculation and further determine the relative position relationship between the two mobile phones.

Alternatively, the electronic device may determine the relative position relationship between the two mobile phones through an ultra-wideband (UWB) positioning technology. The UWB positioning technology has strong penetration, low power consumption, high security, and high positioning accuracy. The UWB positioning technology is mainly based on a UWB chip to achieve high-precision indoor and outdoor positioning. The UWB chip may provide a time stamp for receiving and sending a data frame, which is a basic condition for performing a distance measurement between two points. Simply speaking, a distance between two nodes is measured by calculating a time of flight (TOF) of a data frame in the air * the speed of light=a data flight distance. Alternatively, a time difference at which a data frame arrives at different devices (also referred to as a time difference of arrival (TDOA) direction-finding method) is measured. Details are not described in embodiments of this disclosure.

Alternatively, a technology such as an infrared ray or an ultrasonic wave may be used for calculating a distance between devices based on an infrared ray, an ultrasonic wave, or the like between the electronic device and the two mobile phones, and based on an arrival time of the infrared ray, the ultrasonic wave, or the like between devices. For example, a mobile phone sends an ultrasonic wave, and the electronic device uses a loudspeaker (MIC) to determine a sound phase difference to determine a relative position. Details are not described herein again. Optionally, the smart screen may detect the relative position relationship between the two mobile phones periodically, for example, detect the relative position relationship every 10 seconds. Alternatively, the smart screen detects the relative position relationship between the two mobile phones in real time. This is not limited in embodiments of this disclosure.

According to the foregoing method, in a smart double mirroring scenario, when the smart screen initializes and displays the mirrored pictures corresponding to the two mobile phones, a region for displaying the mirrored pictures of the two mobile phones may be determined based on the relative position of the two mobile phones, so that a user can be prevented from switching the mirrored pictures by a remote control, thereby providing more user-friendly visual experience for the user.

In addition, after the positions of the mobile phone changes, the smart screen can dynamically switch between the double mirrored pictures on the display screen based on a position change of the mobile phone. In this way, the mirrored pictures of the two mobile phones can be adaptively switched based on the mobile phone positions, simplifying user operations. In addition, the original landscape/portrait display mode of the mobile phone can be maintained during this process, providing user experience closer to the mobile phone.

With reference to the first aspect and the foregoing implementations, in some implementations of the first aspect, the first screen-mirroring data includes image data and/or audio data corresponding to the first source device, and the second screen-mirroring data includes image data and/or audio data corresponding to the second source device.

In embodiments of this disclosure, data that is sent by the two mobile phones to the smart screen and that is for displaying a picture and playing audio is collectively referred to as "screen-mirroring data". It should be understood that, for a mobile phone, the screen-mirroring data may include only image data for displaying a mirrored picture, or include only audio data for displaying and playing audio, or include both image data for displaying a mirrored picture and audio data for displaying and playing audio. This is not limited in embodiments of this disclosure.

It should further be understood that, in a possible situation, when positions of the two mobile phones change, mirrored pictures of the two mobile phones may change with time change. For example, a game picture enters a second round from a first round. In this way, screen-mirroring data sent by any mobile phone to the smart screen before and after the position change may be different. Content of the screen-mirroring data is not limited in embodiments of this disclosure.

It should further be understood that, in embodiments of this disclosure, the "screen-mirroring data" may be image data and/or audio data that are/is only used by the mobile phone for mirroring and displaying on a display screen of the smart screen, and the image data may be different from a current display interface of the mobile phone. For example, the screen-mirroring data of the mobile phone includes only the current game interface. Actually, the mobile phone may further display message reminders such as an SMS message and a missed call in the navigation bar. These message reminders and the like may not be sent to the smart screen as screen-mirroring data. Therefore, only the game interface is displayed in a display region of the smart screen, which is different from a current actual interface of the mobile phone. This is not limited in embodiments of this disclosure. Details are not described in subsequent embodiments.

With reference to the first aspect and the foregoing implementations, in some implementations of the first aspect, the electronic device includes a first audio device and a second audio device, and when the first screen-mirroring data includes audio data corresponding to the first source device, and the second screen-mirroring data includes audio data corresponding to the second source device, the method further includes: the electronic device plays audio corresponding to the first source device and/or audio corresponding to the second source device based on the audio data corresponding to the first source device and the audio data corresponding to the second source device through the first audio device and/or the second audio device.

With reference to the first aspect and the foregoing implementations, in some implementations of the first aspect, when the first source device and the second source device have the first relative position relationship, the electronic device plays, through the first audio device, the audio corresponding to the first source device and plays, through the second audio device, the audio corresponding to the second source device. When the electronic device detects that the first source device and the second source device change from the first relative position relationship to the second relative position relationship, the method further includes: the electronic device switches the first audio device to play the audio corresponding to the second source device and switches the second audio device to play the audio corresponding to the first source device.

According to the foregoing method, the electronic device (for example, the smart screen) can dynamically switch between double mirrored pictures on a display screen based on the position changes of the mobile phones, so that mirrored pictures of the two mobile phones can be adaptively switched with the positions of the mobile phones, thereby preventing the user from switching a mirrored picture by a remote control, and simplifying a user operation. In addition, an original landscape/portrait display mode of the mobile phone can be maintained in this process, and user experience closer to the mobile phone is provided. In addition, audio play may also change with a change of a display region on the display screen, and simultaneous switching of a sound and a picture may provide more user-friendly experience.

With reference to the first aspect and the foregoing implementations, in some implementations of the first aspect, the electronic device, the first source device, and the second source device each include the positioning component. That the electronic device determines the relative position between the first source device and the second source device includes: the electronic device determines the relative position between the first source device and the second source device based on the positioning component of the electronic device, the positioning component of the first source device, and positioning component of the second source device, where the positioning component includes at least one of a BLUETOOTH positioning chip, a UWB positioning chip, a WI-FI positioning component, an infrared positioning component, and an ultrasonic positioning component.

According to a second aspect, an electronic device (for example, a smart screen) is provided, including: a display screen (a size of the display screen may be greater than a size of a common mobile phone screen), one or more audio devices, one or more processors, and one or more memories. The memory stores one or more programs. When the one or more programs are executed by the processor, the electronic device is enabled to perform the following steps: displaying a mirrored picture corresponding to a first source device in a first region of the display screen and displaying a mirrored picture corresponding to a second source device in a second region of the display screen based on first screen-mirroring data sent by the first source device and second screen-mirroring data sent by the second source device, where the first source device and the second source device have a first relative position relationship, and the first region and the second region also have the first relative position relationship. When the first source device and the second source device change from the first relative position relationship to a second relative position relationship, the electronic device switches the first region to displaying the mirrored picture corresponding to the second source device and switches the second region to displaying the mirrored picture corresponding to the first source device. The second relative position relationship is different from the first relative position relationship.

With reference to the second aspect, in some implementations of the second aspect, when the one or more programs are executed by the processor, the electronic device is enabled to perform the following step: determining positions of the first source device and the second source device or a relative position relationship between the first source device and the second source device. In addition, that the electronic device displays, based on first screen-mirroring data sent by the first source device and second screen-mirroring data sent by the second source device, the mirrored picture corresponding to the first source device in the first region of the display screen and displays the mirrored picture corresponding to the second source device in the second region of the display screen includes: the electronic device displays, based on positions of the first source device and the second source device or a relative position relationship between the first source device and the second source device and the first screen-mirroring data and the second screen-mirroring data, the mirrored picture corresponding to the first source device in the first region of the display screen and displays the mirrored picture corresponding to the second source device in the second region of the display screen.

With reference to the second aspect and the foregoing implementations, in some implementations of the second aspect, that the first source device and the second source device have the first relative position relationship, and the first region and the second region also have the first relative position relationship includes: in a first reference direction, the first source device is located on a left side of the second source device, and the first region is located on a left side of the second region; and that the first source device and the second source device have the second relative position relationship includes: in the first reference direction, the first source device is located on a right side of the second source device.

With reference to the second aspect and the foregoing implementations, in some implementations of the second aspect, the first screen-mirroring data includes image data and/or audio data corresponding to the first source device, and the second screen-mirroring data includes image data and/or audio data corresponding to the second source device.

With reference to the second aspect and the foregoing implementations, in some implementations of the second aspect, the electronic device includes a first audio device and a second audio device. When the first screen-mirroring data includes the audio data corresponding to the first source device, and the second screen-mirroring data includes the audio data corresponding to the second source device, the method further includes: the electronic device plays, based on the audio data corresponding to the first source device and the audio data corresponding to the second source device through the first audio device and/or the second audio device, audio corresponding to the first source device and/or audio corresponding to the second source device.

With reference to the second aspect and the foregoing implementations, in some implementations of the second aspect, when the first source device and the second source device have the first relative position relationship, the electronic device plays, through the first audio device, the audio corresponding to the first source device, and plays, through the second audio device, the audio corresponding to the second source device. When the electronic device detects that the first source device and the second source device change from the first relative position relationship to the second relative position relationship, the electronic device is further configured to: switch the first audio device to play the audio corresponding to the second source device, and switch the second audio device to play the audio corresponding to the first source device.

With reference to the second aspect and the foregoing implementations, in some implementations of the second aspect, the electronic device, the first source device, and the second source device each include a positioning component, and that the electronic device determines a relative position between the first source device and the second source device includes: the electronic device determines the relative position of the first source device and the second source device based on the positioning component of the electronic device, the positioning component of the first source device, and the positioning component of the second source device, where the positioning component includes at least one of a BLUETOOTH positioning chip, a UWB positioning chip, a WI-FI positioning component, an infrared positioning component, and an ultrasonic positioning component.

According to a third aspect, this disclosure provides an apparatus. The apparatus is included in an electronic device, and the apparatus has a function of implementing behavior of the electronic device in the foregoing aspects and the possible implementations of the foregoing aspects. The function may be implemented by hardware, or may be implemented by executing corresponding software by hardware. The hardware or the software includes one or more modules or units corresponding to the foregoing function. For example, a display module or unit, a detection module or unit, or a processing module or unit.

According to a fourth aspect, this disclosure provides an electronic device, including a touch display screen, where the touch display screen includes a touch-sensitive surface and a display; a positioning component; one or more audio devices; a camera; one or more processors; a memory; a plurality of applications; and one or more computer programs. The one or more computer programs are stored in the memory. The one or more computer programs include instructions. When the instructions are executed by the electronic device, the electronic device is enabled to perform the double-channel screen mirroring method in any possible implementation of any one of the foregoing aspects.

According to a fifth aspect, this disclosure provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the double-channel screen mirroring method according to any possible implementation of any one of the foregoing aspects.

According to a sixth aspect, this disclosure provides a computer-readable storage medium, including computer instructions. When the computer instructions are run on an electronic device, the electronic device is enabled to perform the double-channel screen mirroring method according to any possible implementation of any one of the foregoing aspects.

According to a seventh aspect, this disclosure provides a computer program product. When the computer program product is run on an electronic device, the electronic device is enabled to perform the double-channel screen mirroring method in any possible implementation of any one of the foregoing aspects.

BRIEF DESCRIPTION OF DRAWINGS

FIG. 8A and FIG. 8B are a schematic diagram of another example of a process of displaying a mirrored picture of a mobile phone on a smart screen.

FIG. 9 is a schematic flowchart of an example of a double-channel screen mirroring method according to an embodiment of this disclosure.

FIG. 10 is a schematic flowchart of another example of a double-channel screen mirroring method according to an embodiment of this disclosure.

DESCRIPTION OF EMBODIMENTS

The following describes the technical solutions in embodiments of this disclosure with reference to the accompanying drawings in embodiments of this disclosure. In description in embodiments of this disclosure, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of this disclosure, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

The double-channel screen mirroring method provided in embodiments of this disclosure may be applied to an electronic device such as a mobile phone, a tablet computer, a wearable device, an in-vehicle device, an augmented reality (AR)/virtual reality (VR) device, a notebook computer, an ultra-mobile personal computer (UMPC), a netbook, or a personal digital assistant (PDA). A specific type of the electronic device is not limited in embodiments of this disclosure.

In embodiments of this disclosure, the double-channel screen mirroring method may be applied to a system including a smart screen and at least two mobile phones. The smart screen is used as a large-screen device and may be connected to the at least two mobile phones. In other words, the smart screen may display mirrored pictures of the at least two mobile phones.

It should be understood that embodiments of this disclosure may further be applied to more implementation scenarios. For example, with development of technologies, the smart screen may display mirrored pictures of more mobile phones. A type, a quantity, and the like of electronic devices for mirroring and display are not limited in embodiments of this disclosure.

Figure 1:
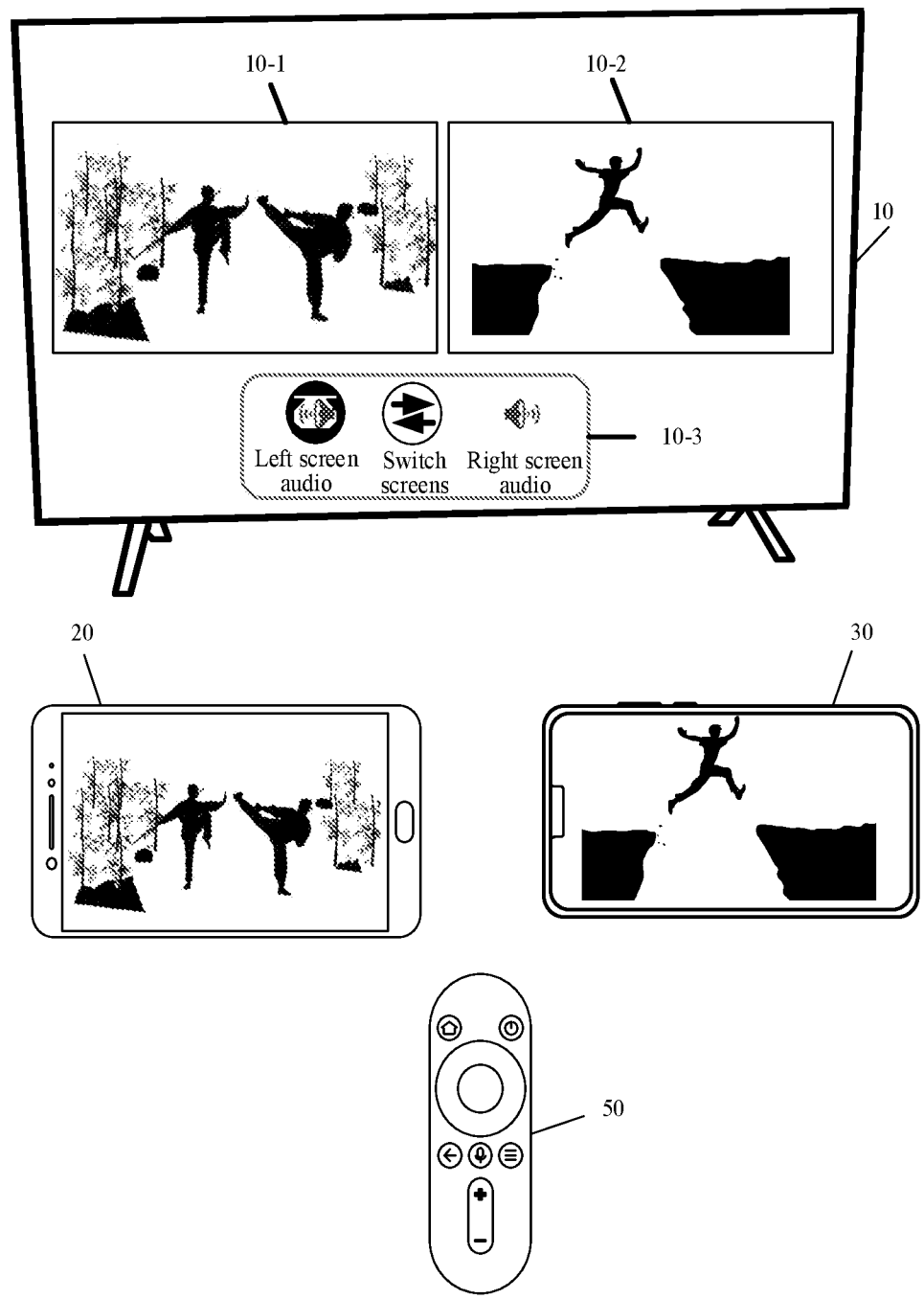
FIG. 1 is a schematic diagram of an example of a scenario of smart double mirroring according to an embodiment of this disclosure.

FIG. 1 is a schematic diagram of an example of a scenario of smart double mirroring according to an embodiment of this disclosure. As shown in FIG. 1, a mobile phone 20 currently displays a game interface of a user, and a mobile phone 30 currently displays a video play interface. A picture of the mobile phone 20 is mirrored and displayed in a display region 10-1 of a display screen of a smart screen 10, and a picture of the mobile phone 30 is mirrored and displayed in a display region 10-2 of the display screen of the smart screen 10.

In a possible implementation, during a smart double mirroring, as shown in FIG. 1, a first mirrored mobile phone picture (for example, the game interface of the mobile phone 20) may be displayed in the display region 10-1 in the left of the smart screen by default, and a second mirrored mobile phone picture (for example, the video play interface of the mobile phone 30) may be displayed in the display region 10-2 in the right of the smart screen. Display positions of the two mobile phone pictures are not limited in this embodiment of this disclosure.

In another possible implementation, the mirrored pictures of the two mobile phones may be displayed on the display screen of the smart screen 10, and may be displayed in a plurality of display manners such as landscape and portrait modes. For example, as shown in FIG. 1, the pictures of the mobile phone 20 and the mobile phone 30 are currently displayed in a landscape mode. In this way, the same landscape display may be maintained when the pictures are mirrored to the smart screen 10.

Alternatively, when the user rotates the mobile phone 30 to perform portrait display, on the smart screen 10, the game interface of the mobile phone 20 may be displayed in a landscape mode in the left display region 10-1, and the video play interface of the mobile phone 30 may be displayed in a portrait mode in the right display region 10-2. This is not limited in this embodiment of this disclosure.

In still another possible implementation, after the two mobile phones are both mirrored to the smart screen 10, in addition to displaying a mirrored picture of the mobile phone through the display screen, the smart screen 10 may further play audio of the mobile phone through an audio device such as a speaker. For example, the smart screen 10 may be set to play audio of a first mobile phone (the mobile phone 20), and the user may switch the smart screen with a remote control to play audio of a second mobile phone (the mobile phone 30). Alternatively, the smart screen 10 has a plurality of audio devices, for example, a left audio device and a right audio device. The left audio device of the smart screen plays left screen audio (audio of the mobile phone 20 corresponding to the left screen region 10-1), the right audio device plays right screen audio (audio of the mobile phone 30 corresponding to the right screen region 10-2), and the like. This is not limited in this embodiment of this disclosure.

For example, as shown in FIG. 1, the user may select, by a remote control 50, the left screen audio of the smart screen 10 to play the audio of the mobile phone 20, and the right screen audio is in a muted state (or in other words, the right audio device is in a sleep state).

In the smart double mirroring scenario described above, if the user wants to change the left and right display regions of the smart screen 10, the user can only perform an operation through a button on the remote control 50. For example, the user can use the remote control 50 to invoke a switching window 10-3 of the smart screen 10, and adjust the display regions corresponding to the double-channel screen mirrored pictures on the smart screen 10 by selecting a menu "screen switching" (or referred to as region switching or picture switching) of the switching window 10-3, or by selecting a menu "left screen audio" and "right screen audio" in the switching window 10-3 to switch audio data corresponding to the left screen audio and the right screen audio of the smart screen.

In addition, when positions of the mobile phone 20 and the mobile phone 30 change, for example, the mobile phone 20 is initially located on a left side of the mobile phone 30, and the mobile phone 20 changes to a right side of the mobile phone 30 after the positions change, the left and right display regions on the smart screen 10 still maintain original display. This display manner is inconvenient for the user to view display pictures of the two mobile phones. The user needs to switch pictures of the left and right display regions of the smart screen 10 with the remote control, and an operation is complex. Particularly, when the user uses the mobile phone 20 and the mobile phone 30 to perform a game battle, to implement pictures in the left and right display regions of the smart screen 10, a current game needs to be paused, and switching is performed using a remote control. This process needs at least 2 to 3 seconds, which is time-consuming and reduces game experience of the user.

Embodiments of this disclosure provide a double-channel screen mirroring method, to automatically adjust a position of a display region on a smart screen based on a position change of a mobile phone of a user, to avoid that the user can switch a position of a mirroring region only through a manual operation such as using a remote control.

Figure 2A:
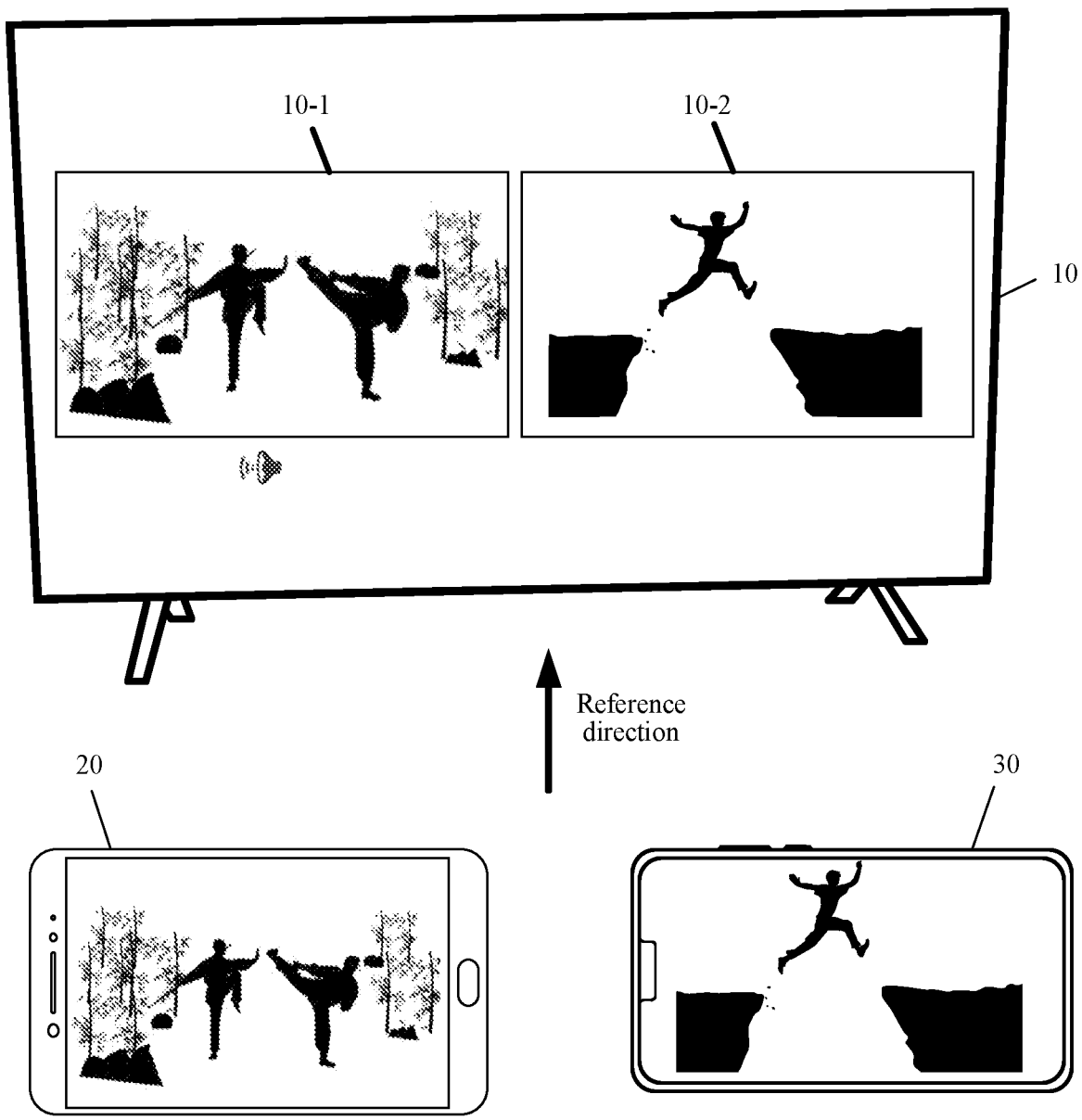
FIG. 2A and FIG. 2B are schematic diagrams of another example of a scenario of smart double mirroring according to an embodiment of this disclosure.
Figure 2B:
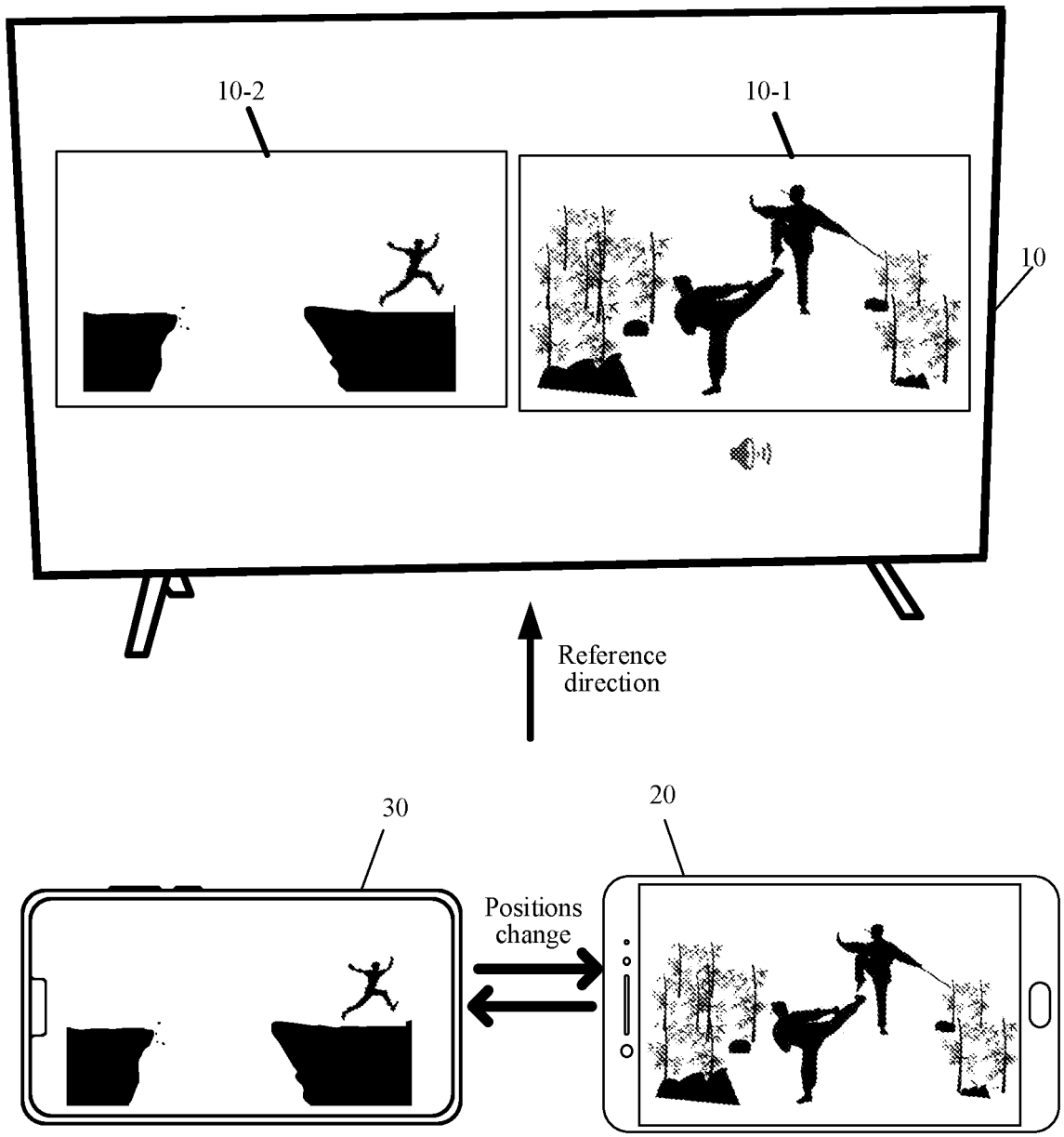

FIG. 2A and FIG. 2B are schematic diagrams of another example of a scenario of smart double mirroring according to an embodiment of this disclosure. As shown in FIG. 2A, the mobile phone 20 currently displays a game interface of the user, and the mobile phone 30 currently displays a video play interface. A mirrored picture of the mobile phone 20 is displayed in the display region 10-1 of the display screen of the smart screen 10, a mirrored picture of the mobile phone 30 is displayed in the display region 10-2 of the display screen of the smart screen 10, and currently, the smart screen 10 plays audio of the mobile phone 20 through a left audio device (or a left speaker), and a right audio device is in a muted state.

In a possible implementation, in a smart double mirroring scenario, when displaying, through initialization, the mirrored pictures corresponding to the two mobile phones, the smart screen 10 may determine, based on a relative position between the two mobile phones, the region 10-1 for displaying the mirrored picture of the mobile phone 20 and the region 10-2 for displaying the mirrored picture of the mobile phone 30.

For example, as shown in FIG. 2A, after receiving the screen-mirroring data sent by the mobile phone 20 and the screen-mirroring data sent by the mobile phone 30, the smart screen 10 may first determine the relative position between the mobile phone 20 and the mobile phone 30. In a reference direction shown by a black arrow in FIG. 2A, the smart screen 10 may determine that the mobile phone 20 is located on the left side of the mobile phone 30. In this way, the smart screen 10 determines that the region 10-1 for displaying the mirrored picture of the mobile phone 20 is located on the left side of the region 10-2 for displaying the mirrored picture of the mobile phone 30, and finally displays the mirrored pictures, as shown in FIG. 2A. Details are not described herein again.

In another possible implementation, in a smart double mirroring scenario, when the relative position between the two mobile phones change, in other words, when the smart screen 10 detects that the relative position between the two mobile phones change from the first relative position relationship to the second relative position relationship, the smart screen 10 may switch positions of the region 10-1 for displaying the mirrored picture of the mobile phone 20 and the region 10-2 for displaying the mirrored picture of the mobile phone 30, so that the region 10-1 and the region 10-2 also meet the second relative position relationship.

When positions of the two mobile phones change, as shown in FIG. 2B, positions of the mobile phone 20 and the mobile phone 30 change. That is, the mobile phone 20 changes from being located on the left side of the mobile phone 30 to being located on the right side of the mobile phone 30. In this embodiment of this disclosure, when positions of the two mobile phones change, the display region 10-1 and the display region 10-2 of the display screen of the smart screen 10 can be automatically switched. In other words, as shown in FIG. 2B, the display region 10-2 for displaying the video play interface of the mobile phone 30 is switched to the left side of the display screen (which may also be understood as switching to-be-displayed data corresponding to the display region in the left of the display screen from the screen-mirroring data of the mobile phone 20 to the screen-mirroring data of the mobile phone 30), and the display region 10-1 for displaying the game interface of the mobile phone 20 is switched to the right of the display screen.

Optionally, the first relative position relationship may indicate that, in the reference direction shown by the black arrow, the mobile phone 20 is located on the left side of the mobile phone 30, and the region 10-1 is located on the left side of the region 10-2. The second relative position relationship indicates that, in the reference direction shown by the black arrow, the mobile phone 20 is located on the right side of the mobile phone 30, and the region 10-1 is located on the right side of the region 10-2.

Alternatively, the first relative position relationship may indicate that, in the reference direction shown by the black arrow, the mobile phone 20 is located on the right side of the mobile phone 30, and the region 10-1 is located on the right side of the region 10-2. The second relative position relationship indicates that, in the reference direction shown by the black arrow, the mobile phone 20 is located on the left side of the mobile phone 30, and the region 10-1 is located on the left side of the region 10-2.

Optionally, in a smart double mirroring scenario, the screen-mirroring data sent by the mobile phone 20 to the smart screen 10 includes image data and/or audio data corresponding to the mobile phone 20, and the screen-mirroring data sent by the mobile phone 30 to the smart screen 10 includes image data and/or audio data corresponding to the mobile phone 30.

In a possible implementation, when the positions of the two mobile phones change, as shown in FIG. 2B, the positions of the mobile phone 20 and the mobile phone 30 change. That is, when the mobile phone 20 changes from being located on the left side of the mobile phone 30 to being located on the right side of the mobile phone 30, screen-mirroring data sent by the mobile phone 20 to the smart screen 10 before and after the position change may be different, and/or screen-mirroring data sent by the mobile phone 30 to the smart screen 10 before and after the position change may be different. This is not limited in this embodiment of this disclosure.

For example, in a reference direction shown by the black arrow in FIG. 2A, when the mobile phone 20 is located on the left side of the mobile phone 30, the smart screen 10 receives the screen-mirroring data sent by the mobile phone 20, and displays, in the region 10-1 based on the screen-mirroring data of the mobile phone 20, the game interface shown in FIG. 2A. The smart screen 10 receives the screen-mirroring data sent by the mobile phone 30, and displays, in the region 10-2 based on the screen-mirroring data of the mobile phone 30, the video picture shown in FIG. 2A. When the position of the mobile phone 20 changes to the right side of the mobile phone 30, the smart screen 10 receives updated screen-mirroring data sent by the mobile phone 20 and updated screen-mirroring data of the mobile phone 30, displays, in the region 10-1 based on the updated screen-mirroring data, a new game interface at a next stage shown in FIG. 2B, and displays, in the region 10-2, an updated video picture shown in FIG. 2B. Different screen-mirroring data results in different interfaces displayed in the region 10-1 and the region 10-2 on the smart screen 10. For example, compared with the region 10-1 in FIG. 2A, the region 10-1 in FIG. 2B is an interface at different stages of the game, and on the game interface at the next stage, an action and a position of a character change. Similarly, compared with the region 10-2 in FIG. 2A, the region 10-2 in FIG. 2B is an interface at different moments in a video play process. At the next moment, the positions of the characters are changed, and details are not described herein.

It should be understood that the screen-mirroring data of the mobile phone 20 or the mobile phone 30 may be different before and after the position change, and the audio data of the mobile phone 20 or the mobile phone 30 may be different before and after the position change. This is not limited in this embodiment of this disclosure.

In the foregoing implementation, the smart screen can dynamically switch between the double-mirrored pictures on the display screen based on the position change of the mobile phone, so that the mirrored pictures of the two mobile phones can be adaptively switched with the positions of the mobile phones, thereby improving user experience of using the smart double mirroring. Particularly, when two users are in a game battle, and when the two users hold a mobile phone to change a position, a display region on the smart screen also changes correspondingly, so that the user is prevented from pausing the game to switch a display region, thereby greatly improving user experience.

In still another possible implementation, audio play of the smart screen 10 is also switched with switching between the display region 10-1 and the display region 10-2 on the display screen. For example, as shown in FIG. 2A, the user previously sets the smart screen 10 to play the audio of the mobile phone 20 through the left audio device. When positions of the two mobile phones change, that is, the mobile phone 20 changes from being located on a left side of the mobile phone 30 to being located on the right side of the mobile phone 30, as shown in FIG. 2B, after the display region 10-1 of the game interface of the mobile phone 20 is switched to the right side of the display screen, the smart screen 10 may activate the right audio device and play the audio of the mobile phone 20 through the right audio device, and the left audio device is switched to a mute state (or the left audio device is in a sleep state).

In the foregoing implementation, the smart screen can dynamically switch between the double-mirrored pictures on the display screen based on the position change of the mobile phone, so that the mirrored pictures of the two mobile phones can be adaptively switched with the positions of the mobile phones, audio play can also change with the change of the display region on the display screen, and a sound and a picture can be simultaneously switched, thereby providing more user-friendly experience.

Figure 3A:
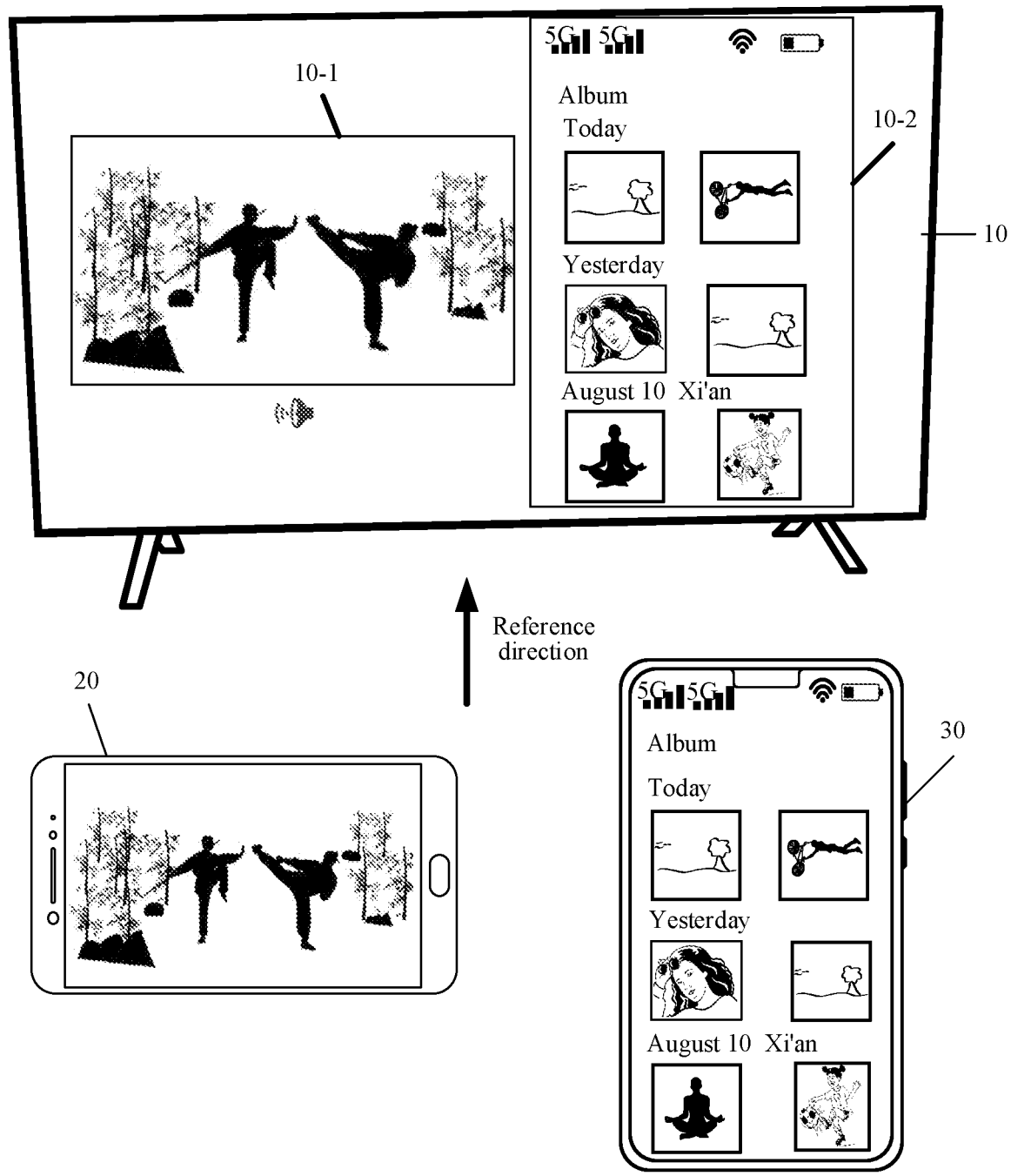
FIG. 3A and FIG. 3B are schematic diagrams of still another example of a scenario of smart double mirroring according to an embodiment of this disclosure.
Figure 3B:
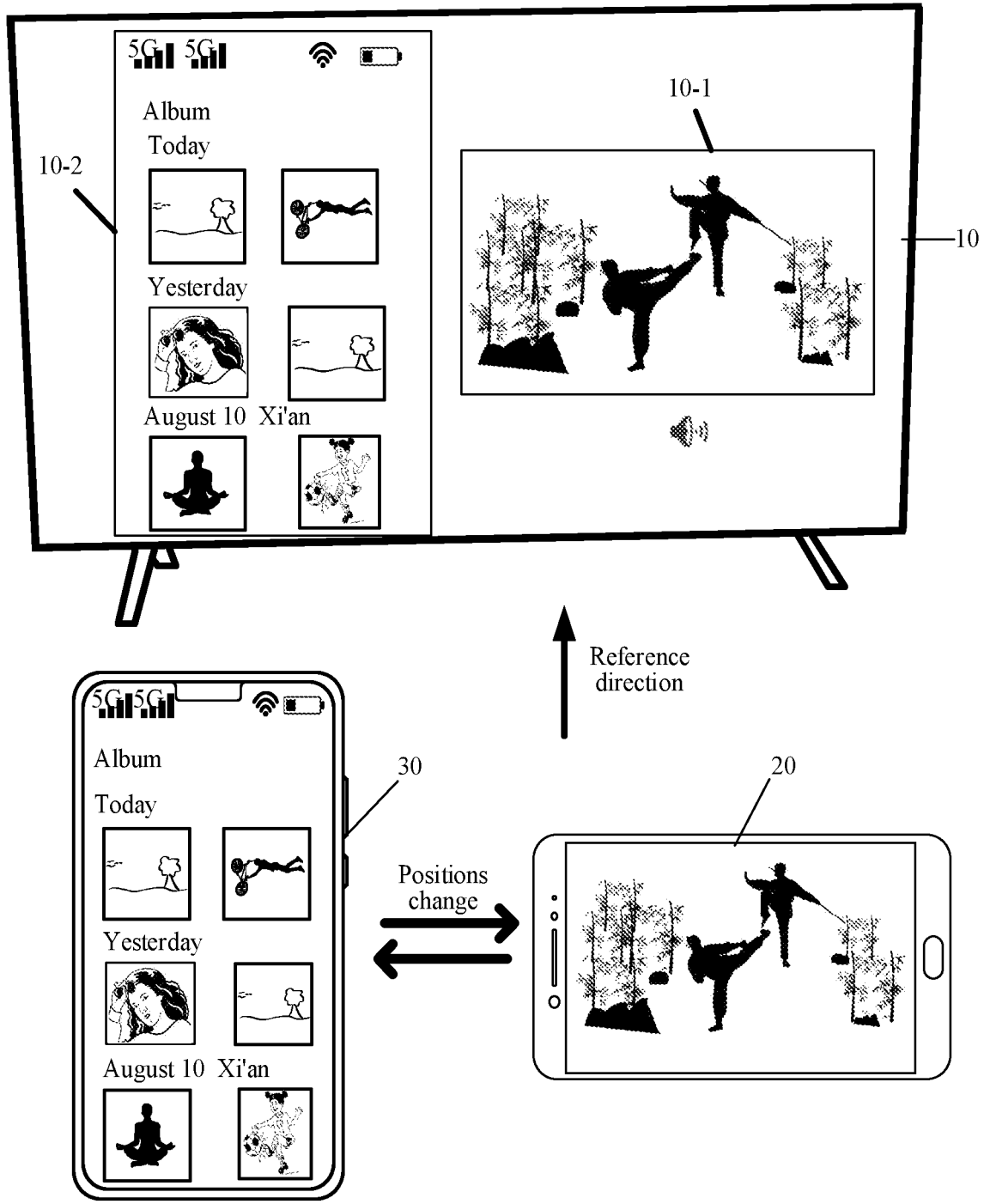

FIG. 3A and FIG. 3B are schematic diagrams of still another example of a scenario of smart double mirroring according to an embodiment of this disclosure. As shown in FIG. 3A, the mobile phone 20 currently displays a game interface of the user, and the mobile phone 30 currently displays an album interface. A picture of the mobile phone 20 is mirrored and displayed in the display region 10-1 of the display screen of the smart screen 10, and a picture of the mobile phone 30 is mirrored and displayed in the display region 10-2 of the display screen of the smart screen 10. Currently, the smart screen 10 plays audio of the mobile phone 20 through the left audio device, and the right audio device is in a muted state.

In a possible implementation, the smart screen 10 may adapt to the landscape/portrait mode of the mobile phone to display a corresponding mirrored picture. For example, as shown in FIG. 3A, the mobile phone 20 displays the game interface of the user in the landscape mode, and the display region 10-1 of the mobile phone 20 displayed on the smart screen 10 is also represented as a mirroring size that adapts to the landscape mode. The mobile phone 30 displays the album interface in the portrait mode, and the display region 10-2 of the mobile phone 30 displayed on the smart screen 10 is also represented as a mirroring size that adapts to the portrait mode.

It should be understood that a size of the display region that is on the smart screen and that is for displaying the mirrored picture of the mobile phone may be adaptively adjusted based on a size of the smart screen, a size and a style of the mirrored picture of the mobile phone, and the like. The size of the display region on the smart screen is not limited in this embodiment of this disclosure.

In still another possible implementation, in a smart double mirroring scenario, when the relative position between the two mobile phones change, in other words, when the smart screen 10 detects that the relative position between the two mobile phones change from the first relative position relationship to the second relative position relationship, the smart screen 10 may switch positions of the region 10-1 for displaying the mirrored picture of the mobile phone 20 and the region 10-2 for displaying the mirrored picture of the mobile phone 30, and the switched region 10-1 and region 10-2 maintain an original landscape/portrait display mode. In this way, the region 10-1 and the region 10-2 also meet the second relative position relationship.

For example, when the positions of the two mobile phones change, as shown in FIG. 3B, the positions of the mobile phone 20 and the mobile phone 30 change, that is, the mobile phone 20 changes from being located on the left side of the mobile phone 30 to being located on the right side of the mobile phone 30. In this embodiment of this disclosure, when the positions of the mobile phone changes, the display region 10-1 and the display region 10-2 of the display screen of the smart screen 10 are also automatically switched, and a corresponding landscape/portrait mode of the mobile phone is maintained in the switching process. In other words, as shown in FIG. 3B, when the display region 10-2 for displaying the album interface of the mobile phone 30 is switched to the left side of the display screen, a portrait mode is still maintained; and when the display region 10-1 for displaying the game interface of the mobile phone 20 is switched to the right side of the display screen, a landscape mode is still maintained.

In another possible implementation, audio play of the smart screen 10 is also switched with switching between the display region 10-1 and the display region 10-2 on the display screen. For example, as shown in FIG. 3B, after the display region 10-2 that displays the album interface of the mobile phone 30 is switched to the display region 10-1 that is for displaying the game interface of the mobile phone 20, the smart screen 10 may activate the right audio device, that is, play the audio of the mobile phone 20 through the right audio device, and the left audio device is switched to a muted state (or the left audio device is in a sleep state).

In the foregoing implementation, the smart screen can dynamically switch between the double-mirrored pictures on the display screen based on the position change of the mobile phones, so that the mirrored pictures of the two mobile phones can be adaptively switched with the positions of the mobile phones, and an original landscape/portrait display mode of the mobile phone can be maintained, thereby providing a user experience closer to the mobile phone. In addition, the audio play can also change with the change of the display region on the display screen, and the sound and the picture can be switched simultaneously, thereby providing more user-friendly experience.

Optionally, in a smart double mirroring scenario, the screen-mirroring data sent by the mobile phone 20 to the smart screen 10 includes image data and/or audio data corresponding to the mobile phone 20, and the screen-mirroring data sent by the mobile phone 30 to the smart screen 10 includes image data and/or audio data corresponding to the mobile phone 30.

In a possible implementation, when positions of the two mobile phones change, as shown in FIG. 2B or FIG. 3B, the positions of the mobile phone 20 and the mobile phone 30 change. That is, when the mobile phone 20 changes from being located on the left side of the mobile phone 30 to being located on the right side of the mobile phone 30, the screen-mirroring data sent by the mobile phone 20 to the smart screen 10 before and after the position change may be different, and/or the screen-mirroring data sent by the mobile phone 30 to the smart screen 10 before and after the position change may be different. This is not limited in this embodiment of this disclosure.

For example, in the reference direction shown by the black arrow in FIG. 3A, when the mobile phone 20 is located on the left side of the mobile phone 30, the smart screen 10 receives the first screen-mirroring data sent by the mobile phone 20, and displays, in the region 10-1 based on the first screen-mirroring data, the game interface shown in FIG. 3A. When the position of the mobile phone 20 changes to the right side of the mobile phone 30, the smart screen 10 receives the updated screen-mirroring data sent by the mobile phone 20, and displays, in the region 10-1 based on the updated screen-mirroring data, a game interface shown in FIG. 3B. Different screen-mirroring data causes differences between two game interfaces displayed in the region 10-1 on the smart screen 1. For example, compared with FIG. 3A, FIG. 3B is an interface at a next stage of the game. On the game interface at the next stage, an action and a position of a character change, and details are not described herein again.

It should be understood that the screen-mirroring data of the mobile phone 20 or the mobile phone 30 may be different before and after the position change, and the audio data of the mobile phone 20 or the mobile phone 30 may be different before and after the position change. This is not limited in this embodiment of this disclosure.

It should further be understood that, in this embodiment of this disclosure, the "screen-mirroring data" may be image data and/or audio data that are/is only used by the mobile phone 20 (or the mobile phone 30) for mirroring and displaying on the display screen of the smart screen 10. The image data may be different from a current display interface of the mobile phone 20. For example, for the scenario shown in FIG. 3A, the screen-mirroring data of the mobile phone 20 includes only a current game interface. Actually, the mobile phone 20 may further display message reminders such as an SMS message and a missed call in the navigation bar. These message reminders and the like may not be sent to the smart screen 10 as screen-mirroring data. Therefore, only the game interface is displayed in the display region 10-1 on the smart screen 10, which is different from a current actual interface of the mobile phone 20. Content of the screen-mirroring data is not limited in this embodiment of this disclosure, and details are not described in subsequent embodiments.

According to FIG. 1 to FIG. 3B, an application scenario in which two mobile phone pictures are displayed on a smart screen is used as an example to describe the double-channel screen mirroring method provided in embodiments of this disclosure. An electronic device such as a smart screen or a mobile phone may have all or some of the structures shown in FIG. 4.

Figure 4:
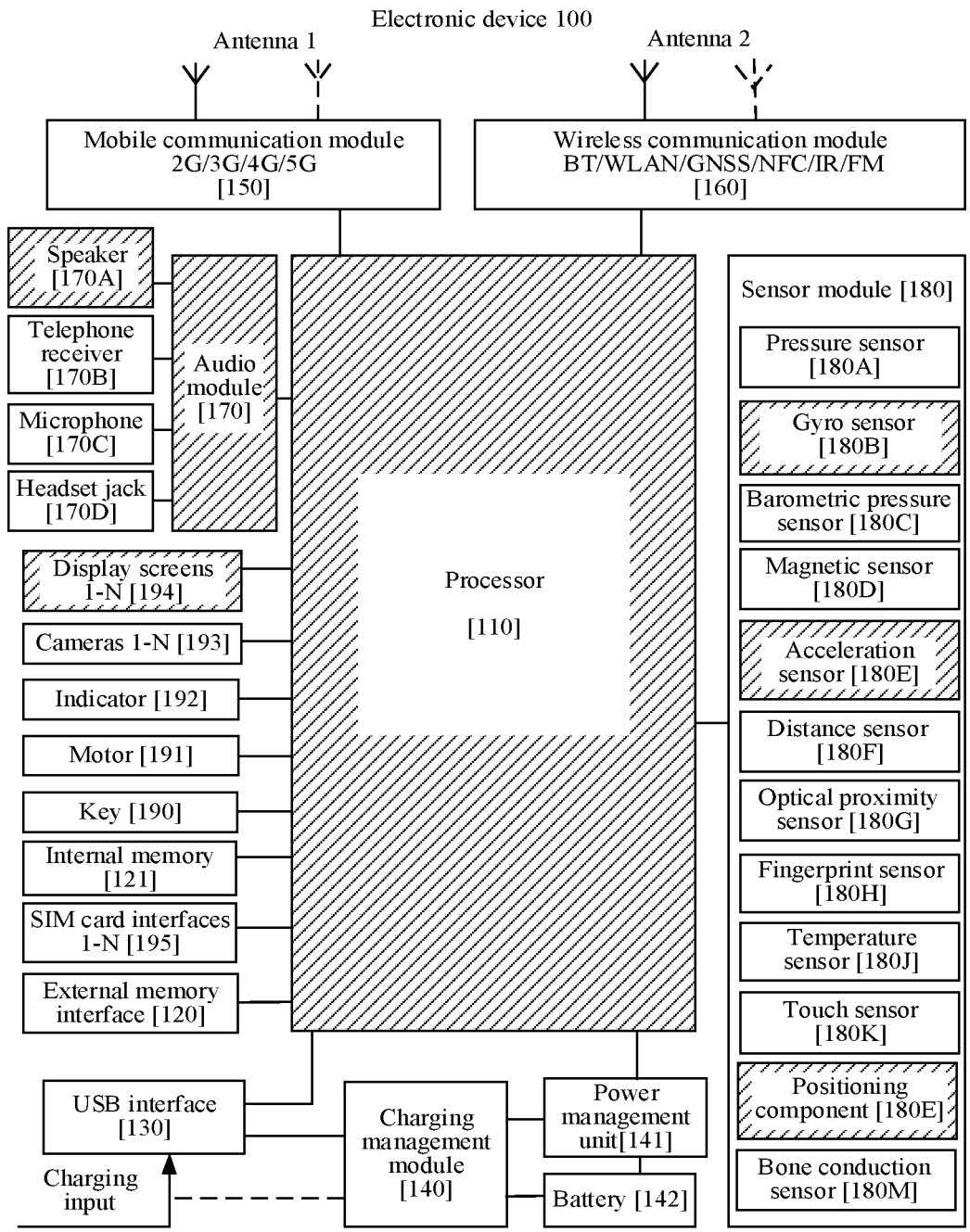
FIG. 4 is a schematic diagram of an example of a structure of an electronic device according to an embodiment of this disclosure.

For example, FIG. 4 is a schematic diagram of an example of a structure of an electronic device according to an embodiment of this disclosure. The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a key 190, a motor 191, an indicator 192, a camera 193, and a display screen 194, and a subscriber identity module (SIM) card interface 195. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may further be disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a BLUETOOTH headset.

The PCM interface may also be used for audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a BLUETOOTH headset. Both the I2S interface and the PCM interface may be used for audio communication.

The UART interface is a universal serial data bus, and is configured for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a BLUETOOTH module in the wireless communication module 160 through the UART interface, to implement a BLUETOOTH function. In some embodiments, the audio module 170 may transmit an audio signal to the wireless communication module 160 through the UART interface, to implement a function of playing music through a BLUETOOTH headset.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display screen 194 via the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may further be configured to connect to another electronic device such as an AR device.

It may be understood that an interface connection relationship between the modules illustrated in this embodiment of this disclosure is merely an example for description, and constitutes no limitation on the structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display screen 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the telephone receiver 170B, or the like), or displays an image or a video by the display screen 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like and that is applied to the electronic device 100. The wireless communication module 160 may be one or more devices integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 is coupled to the mobile communication module 150 in the electronic device 100, and the antenna 2 is coupled to the wireless communication module 160, so that the electronic device 100 can communicate with a network and another device through a wireless communication technology. The wireless communication technology may include a Global System for Mobile Communications (GSM), a General Packet Radio Service (GPRS), code-division multiple access (CDMA), wideband code-division multiple access (WCDMA), time-division-code-division multiple access (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a Quasi-Zenith Satellite System (QZSS), and/or a satellite-based augmentation system (SBAS).

In this embodiment of this disclosure, the smart screen and the two mobile phones may communicate with each other in any possible manner. The smart screen and the mobile phone may communicate with each other by establishing a WI-FI connection, a BT connection, an NFC connection, or a manner of using a future communication technology, to exchange an instruction, or the like. Alternatively, the smart screen and the mobile phone may communicate with each other through a wired connection, for example, may include a USB connection. A communication manner between the smart screen and the two mobile phones is not limited in this embodiment of this disclosure.

The electronic device 100 may implement a display function through the GPU, the display screen 194, the application processor, and the like. The GPU is a microprocessor for image processing, and is connected to the display screen 194 and the application processor. The GPU is configured to perform mathematical and geometric computation, and render graphics. The processor 110 may include one or more GPUs, which execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N display screens 194, where N is a positive integer greater than 1.

In this embodiment of this disclosure, the smart screen may display mirrored pictures of two mobile phones, and the mobile phones may transmit screen display data to the smart screen. The smart screen parses the screen display data, and performs drawing and rendering to display the mirrored pictures of the two mobile phones on the display screen on split screens. Details are not described herein again.

The electronic device 100 may implement a photographing function through the camera 193, the ISP, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information based on a structure of a biological neural network, for example, based on a transfer mode between human brain neurons; and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro Secure Digital (SD) card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random-access memory (RAM), and may further include a nonvolatile memory, for example, at least one magnetic disk storage device, a flash memory, or a Universal Flash Storage (UFS).

The electronic device 100 may implement an audio function, for example, music playing and recording, through the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may further be configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used for listening to music or answering a call in a hands-free mode over the speaker 170A. In this embodiment of this disclosure, the mobile phone may further transmit audio data to the smart screen, and the smart screen parses the audio data, and plays audio of the mobile phone through the speaker 170A of the smart screen.

Optionally, the smart screen may include one or more speakers (which may also be referred to as an "audio module"), for example, a left speaker and a right speaker. The two speakers may separately play audio of two mobile phones, or only one of the speakers plays audio of one mobile phone selected by the user, and the other mobile phone is in a muted state. This is not limited in this embodiment of this disclosure.

The telephone receiver 170B, also referred to as an "earpiece", is configured to convert an electrical audio signal into a sound signal. When a call is answered or speech information is received through the electronic device 100, the telephone receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 millimeter (mm) Open Mobile Terminal Platform (OMTP) standard interface or Cellular Telecommunications Industry Association (CTIA) standard interface.

The pressure sensor 180A is configured to sense a pressure signal, and can convert the pressure signal into an electrical signal. The barometric pressure sensor 180C is configured to measure barometric pressure. The magnetic sensor 180D includes a Hall sensor.

The gyroscope sensor 180B and the acceleration sensor 180E may be configured to determine a motion posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be configured in a navigation scenario and a somatic game scenario.

The distance sensor 180F may monitor a distance between the electronic device and another electronic device. The optical proximity sensor 180G may include, for example, a light-emitting diode (LED), and an optical detector, for example, a photodiode. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display screen 194. In some other embodiments, the touch sensor 180K may also be disposed on a surface of the electronic device 100 at a position different from that of the display screen 194.

The positioning component 180E may include a positioning chip, a positioning sensor, or the like. For example, the positioning component includes a BLUETOOTH positioning chip, a UWB wireless positioning chip, an infrared positioning component, an ultrasonic positioning component, and the like. This is not limited in this embodiment of this disclosure.

In this embodiment of this disclosure, a relative position between the smart screen and the mobile phone may be determined based on the positioning component 180E, another sensor, or the like. The mobile phone may determine a landscape/portrait display status and the like based on various sensors, and transmit the landscape/portrait display status information to the smart screen. Details are not described herein again.

The key 190 includes a power button, a volume button, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different regions of the display screen 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this disclosure, an Android® system with the layered architecture is used as an example to illustrate a software structure of the electronic device 100.

Figure 5:
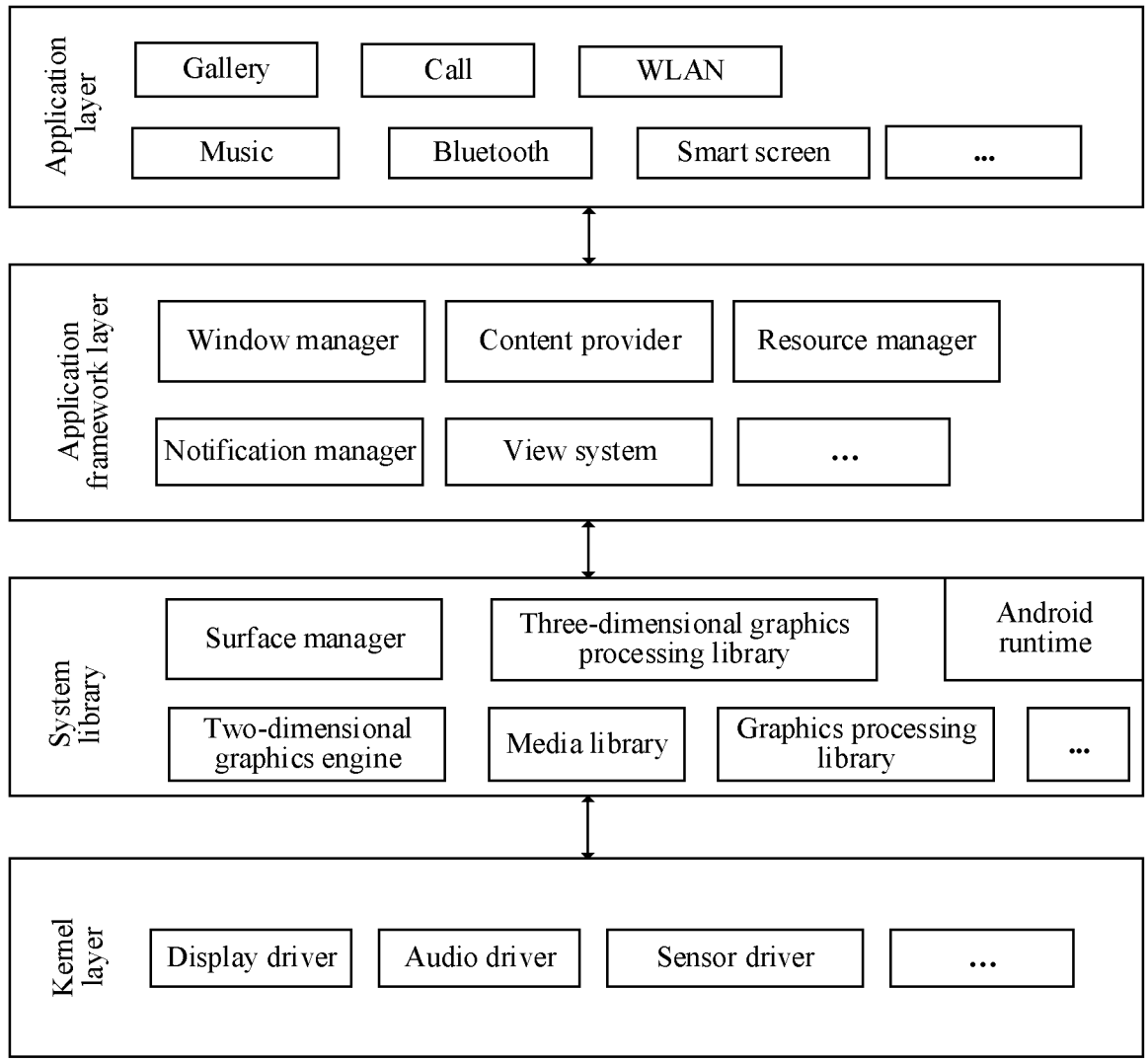
FIG. 5 is a block diagram of a software structure of an electronic device according to an embodiment of this disclosure.

FIG. 5 is a block diagram of a software structure of an electronic device 100 according to an embodiment of this disclosure. In a layered architecture, software is divided into several layers, and each layer has a clear role and task. The layers communicate with each other through a software interface. It should be understood that, in this embodiment of this disclosure, the smart screen and the mobile phone may have a same or different software structures. An example in which the smart screen and the mobile phone have an Android® system is used herein for description.

In some embodiments, the Android® system is divided into four layers: an application layer, an application framework layer, an Android® runtime and system library, and a kernel layer from top to bottom. The application layer may include a series of application packages.

As shown in FIG. 5, the application package may include applications such as a gallery, a call, a WLAN, music, BLUETOOTH, and a smart screen.

The application framework layer provides an application programming interface (API) and a programming framework for an application at the application layer. The application framework layer includes some predefined functions.

As shown in FIG. 5, the application framework layer may include a window manager, a content provider, a view system, a resource manager, a notification manager, and the like.

The window manager is configured to manage a window program. The window manager may obtain a size of a display screen, determine whether the display screen includes a status bar, and assist in performing operations such as screen locking and screen capturing.

The content provider is configured to store and obtain data, and enable the data to be accessed by an application. The data may include a video, an image, audio, a call that is made or answered, a browsing history and a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in a status bar, and may be used for delivering a message to a user. The message may automatically disappear after a short stay without user interaction. For example, download completion message.

The Android® runtime includes a kernel library and a virtual machine. The Android® runtime is responsible for scheduling and management of the Android® system.

The kernel library includes two parts: a function that needs to be called in Java language and a kernel library of Android®.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this disclosure, the window manager, the content provider, the view system, the resource manager, and the like at the application framework layer cooperate with each other, to package screen content of the mobile phone in a form of screen data and transmit the screen content to the smart screen. After parsing the screen data, the smart screen obtains corresponding data through the window manager, the content provider, the view system, the resource manager, and the like, and renders and draws the screen data through the surface manager, the two-dimensional graphics engine, the image processing library, and the like of the system library, in this way, the screen picture of the mobile phone is displayed on the display screen. Implementation details of the mirroring process are not limited in this embodiment of this disclosure.

For ease of understanding, in the following embodiments of this disclosure, an electronic device having the structures shown in FIG. 4 and FIG. 5 is used as an example, and an application scenario in which two mobile phone pictures are mirrored to a smart screen in two channels is used as an example. With reference to the accompanying drawings, the double-channel screen mirroring method provided in embodiments of this disclosure is described.

Before the double-channel screen mirroring method provided in embodiments of this disclosure is described, several methods for double-channel screen mirroring of mirrored pictures of two mobile phones to a smart screen are first described.

Figure 6A:
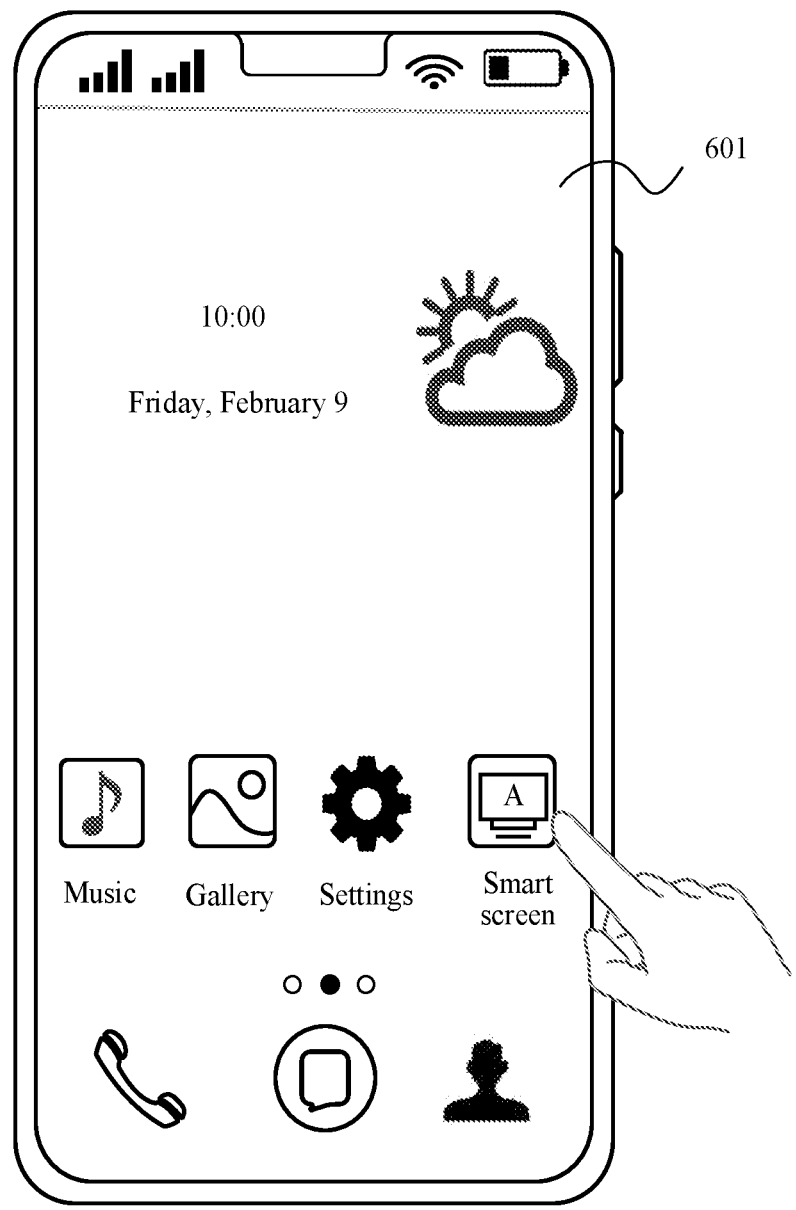
FIG. 6A to FIG. 6E are a schematic diagram of an example of a graphical user interface in a process of mirroring a picture of a mobile phone to a smart screen.

FIG. 6A to FIG. 6E are a schematic diagram of a graphical user interface (GUI) in a process of mirroring a picture of a mobile phone to a smart screen. FIG. 6A shows a currently displayed home screen 601 of a mobile phone in an unlock mode. The home screen 601 displays a plurality of applications (Apps), for example, applications such as music, gallery, settings, and smart screen. It should be understood that the home screen 601 may further include more other applications. This is not limited in this embodiment of this disclosure.

As shown in FIG. 6A, the user may tap a "Smart screen" application on the home screen 601, and in response to a tap operation of the user, the mobile phone enters a running interface of the smart screen application. The running interface of the smart screen may provide a series of operation guides for the user, to implement connection between the mobile phone and the smart screen, and mirror a picture of the mobile phone to the smart screen.

Figure 6B:
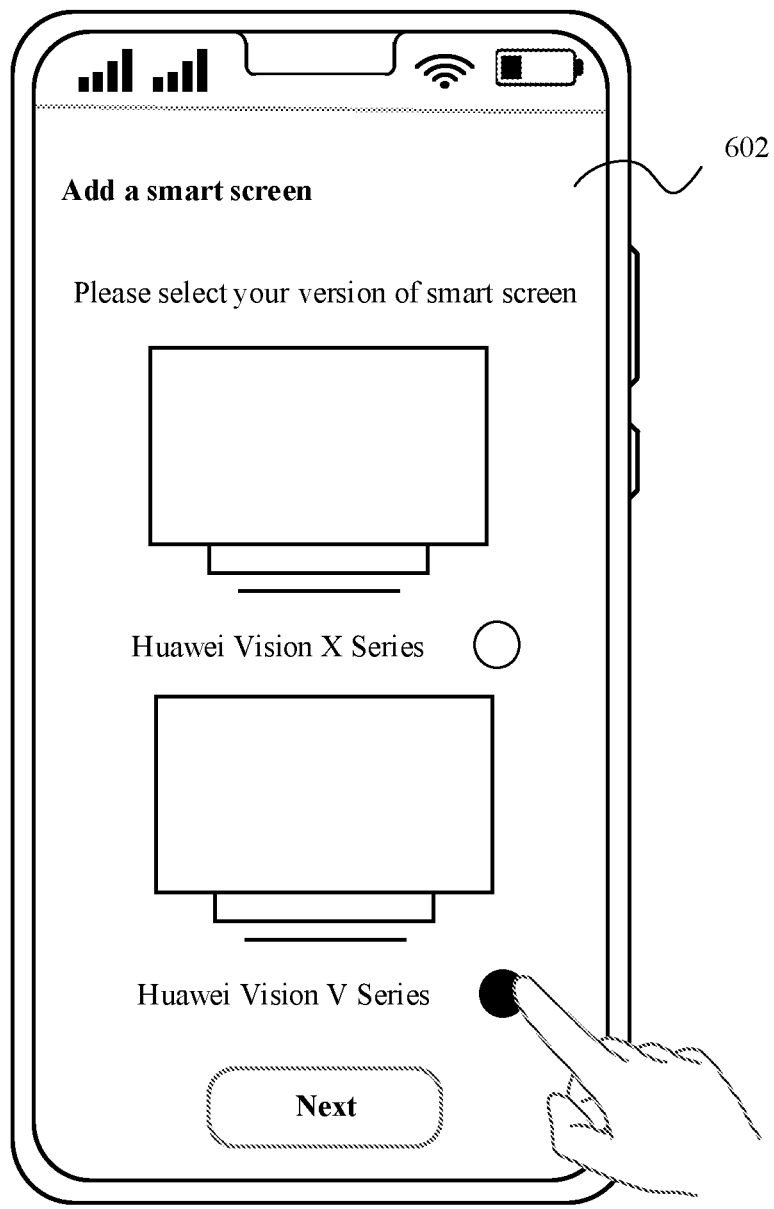
Figure 6C:
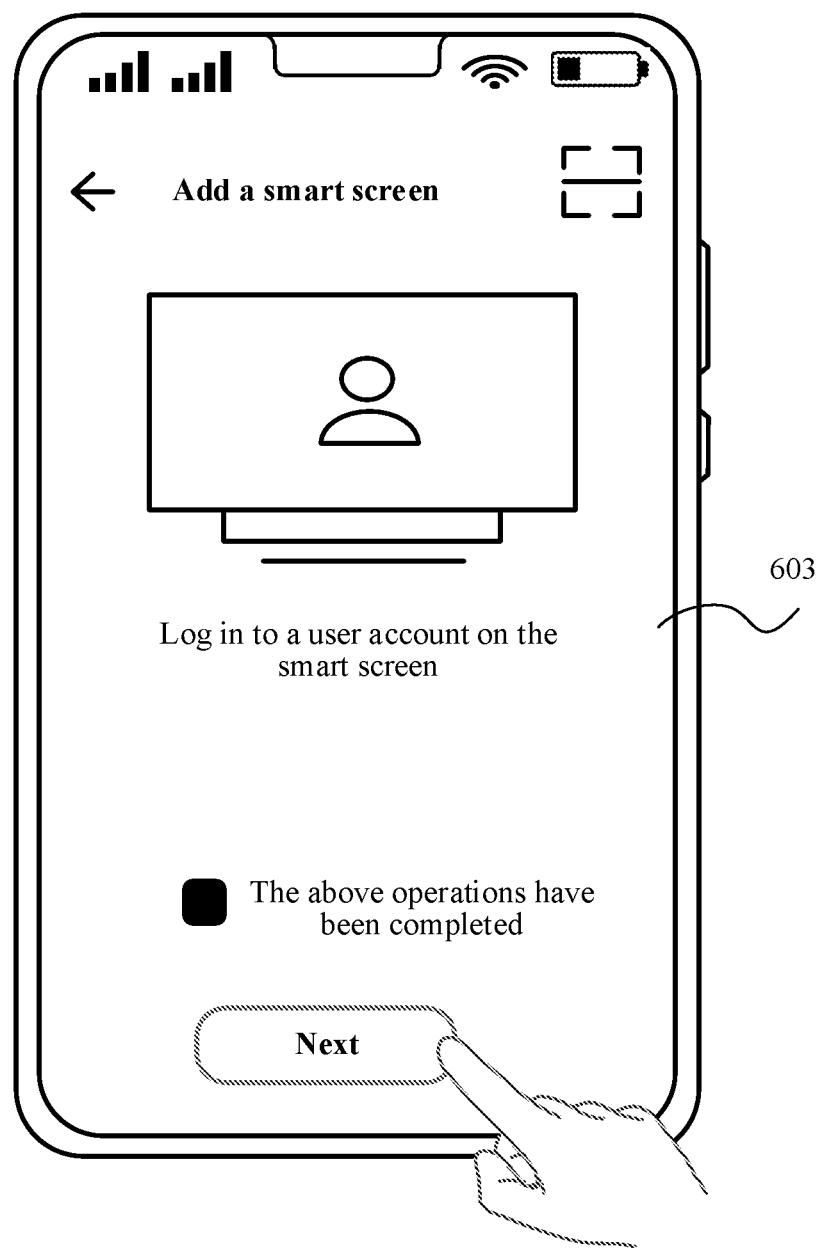
Figure 6D:
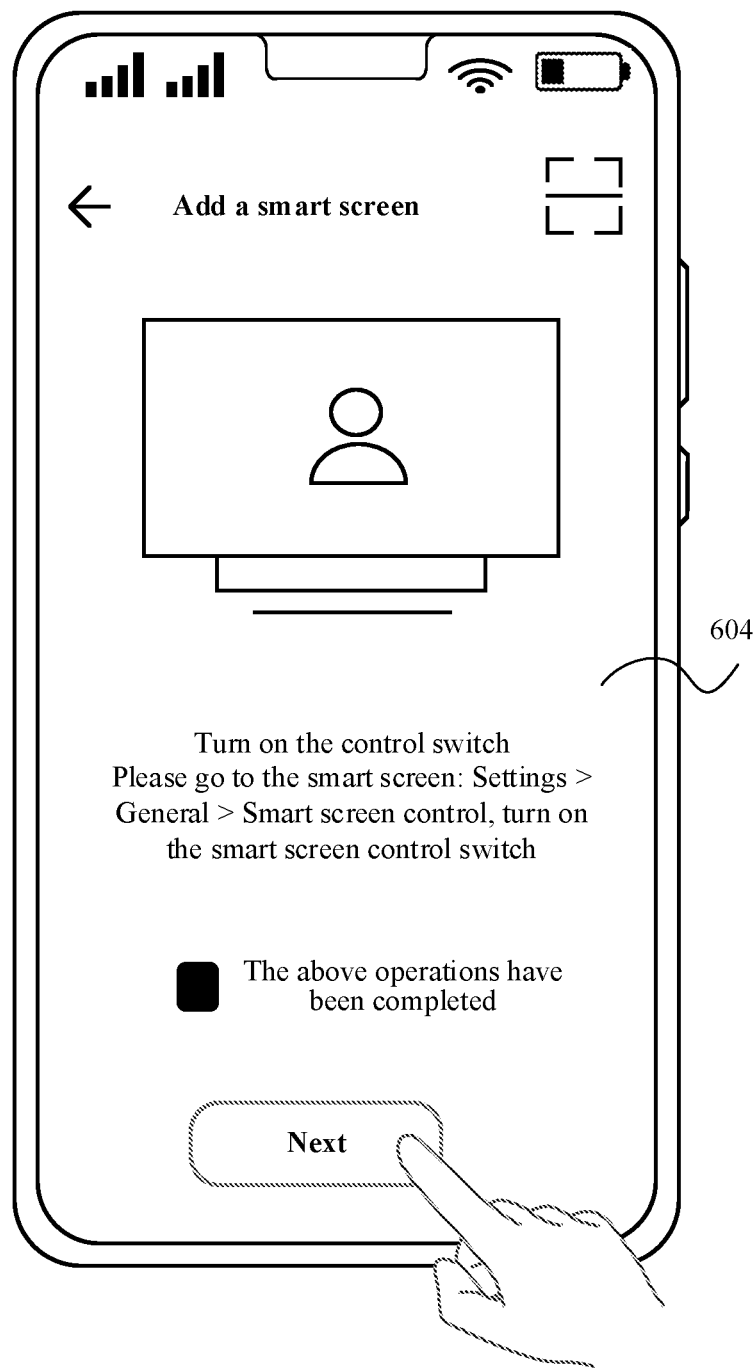
Figure 6E:
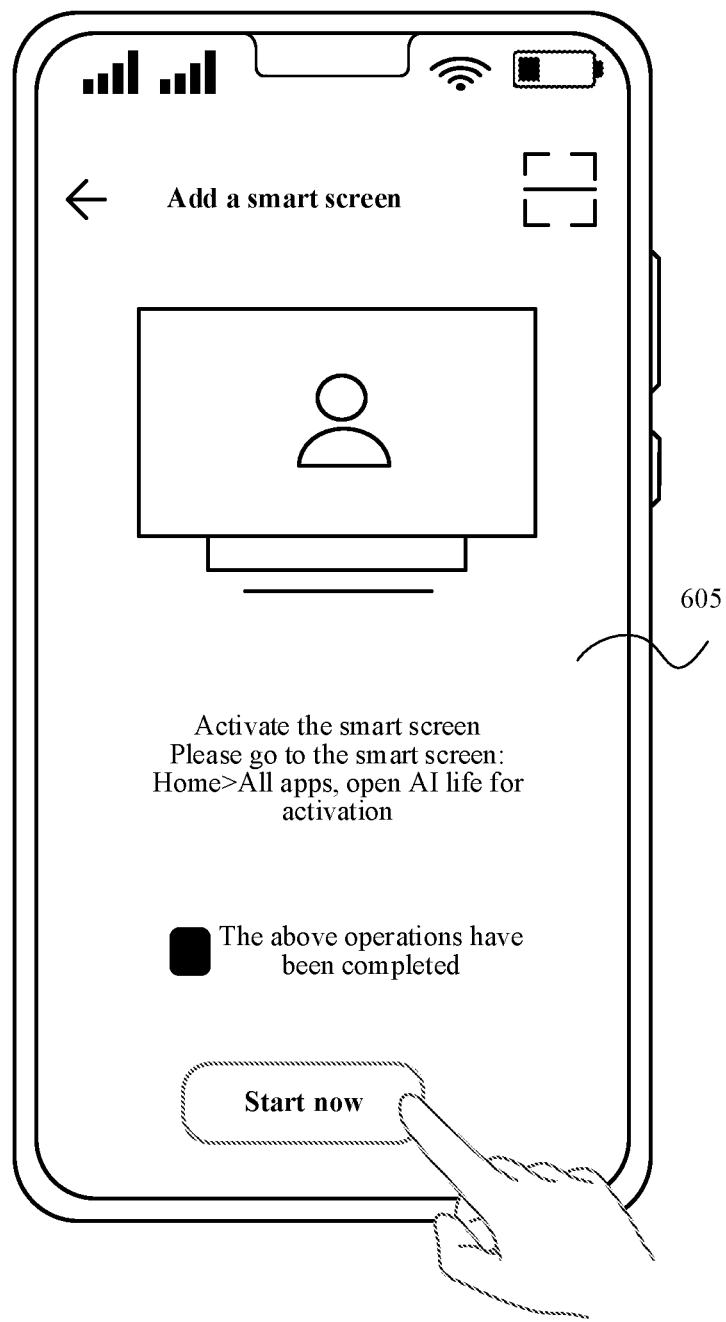

Optionally, the running interface of the Huawei Vision application may include an operation guide interface shown in FIG. 6B to FIG. 6E. For example, as shown in FIG. 6B, the operation guide interface 602 provides a first step of adding a Huawei Vision for the user, and is used by the user to select a type of a to-be-added Huawei Vision, for example, "Huawei Vision X Series" or "Huawei Vision V Series". It should be understood that more different types of smart screens of different brands may be displayed on the operation guide interface 602. This is not limited in this embodiment of this disclosure.

For example, as shown in FIG. 6B, after selecting "Huawei Vision V series", the user may tap a "Next" button, and in response to a tap operation of the user, the mobile phone displays an operation guide interface 603 for a next step. The operation guide interface 603 may display prompt information "Log in to a Huawei account on the smart screen", and the user may log in to a Huawei account that is the same as that of the mobile phone on the smart screen based on the prompt information.

After the user completes an operation of logging in to the Huawei account on the smart screen, the user may select an option of "The above operation has been completed", and tap a "Next" button on the operation guide interface 603. In response to the tap operation of the user, the mobile phone displays a further operation guide interface 604. The operation guide interface 604 may display prompt information "Turn on the control switch". Optionally, the prompt information may further be a specific path displayed by the user in detail for turning on the control switch on the smart screen. For example, the specific path may indicate: go to smart screen settings>General>Smart screen control>Turn on the control switch on the smart screen, and the like.

After the user completes an operation of turning on the smart screen control switch on the smart screen, the user may select an option of "The above operation has been completed" on the operation guide interface 604, and tap a "Next" button on the operation guide interface 604. In response to a tap operation of the user, the mobile phone displays a further operation guide interface 605. The operation guide interface 605 may display prompt information "Activate the smart screen". Optionally, the prompt information may further be a specific path for activating the smart screen displayed by the user in detail. For example, to activate the smart screen, go to the home page of the Huawei Vision>All apps>Open AI Life.

After the user completes the operation of activating the smart screen, the user may select an option of "The above operation has been completed" on the operation guide interface 605, and tap a "Start now" button on the operation guide interface 605. In response to a tap operation of the user, the mobile phone may connect to the smart screen that has been activated by the user, and display a mirrored picture of the mobile phone on the smart screen.

Similarly, the user may further perform a same operation on the second mobile phone, connect the second mobile phone to the smart screen activated by the user, and mirror a mirrored picture of the second mobile phone to the smart screen for display.

Figure 7:
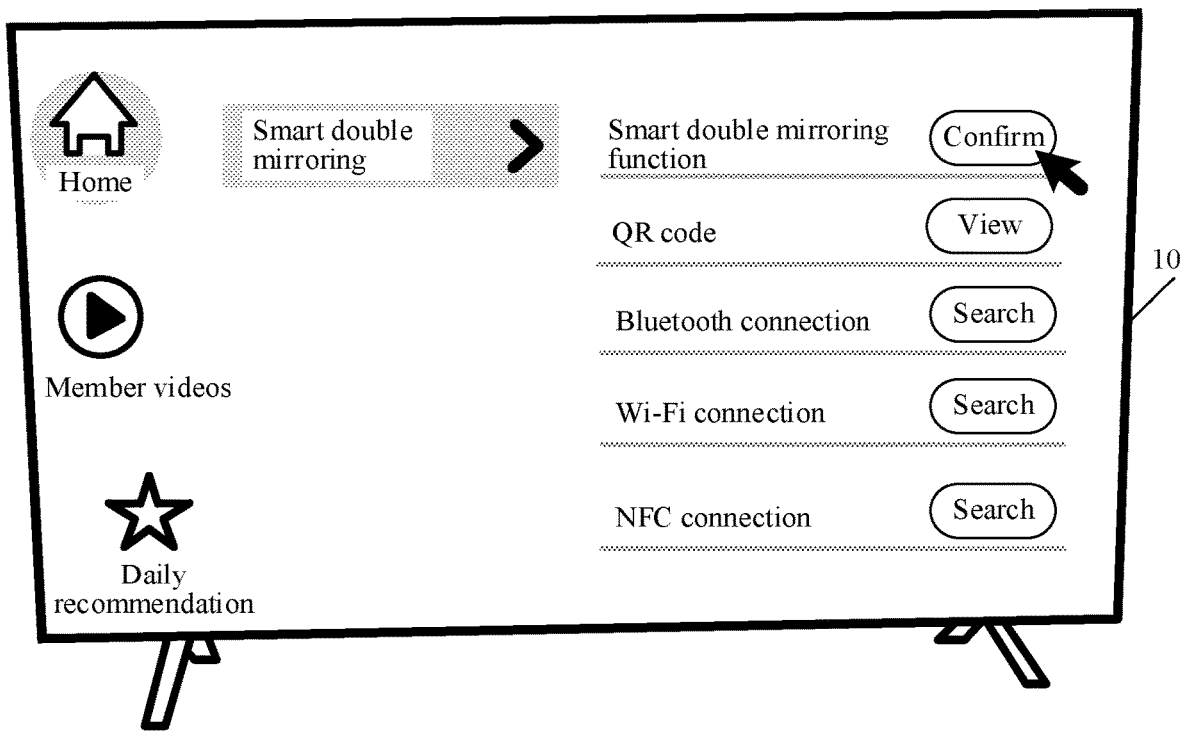
FIG. 7 is a schematic diagram of an example of enabling a smart screen smart double mirroring.

FIG. 7 is a schematic diagram of an example of enabling a smart screen smart double mirroring. The user may enable the smart double mirroring function on the smart screen 10. As shown in FIG. 7, the user may perform the following steps on the home page of the smart screen 10: Smart screen home page>General>Smart double mirroring>Smart double mirroring switch, and then tap the confirm button of the smart double mirroring switch to enable the smart double mirroring function of the smart screen 10. It should be understood that there may be a plurality of possible manners of enabling the smart double mirroring function. This is not limited in this embodiment of this disclosure.

Figure 8A:
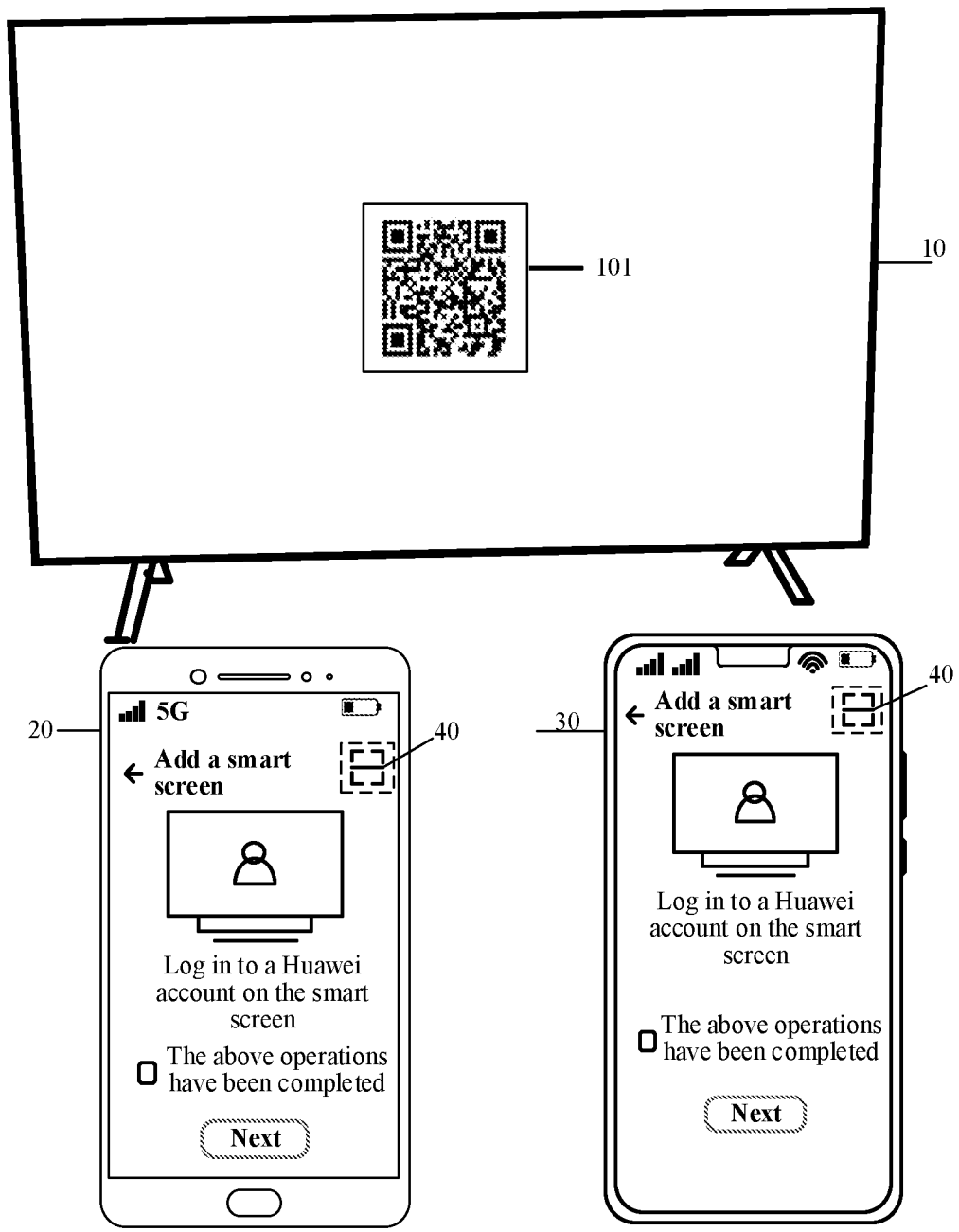

FIG. 8A and FIG. 8B are a schematic diagram of another example of a process of displaying a mirrored picture of a mobile phone on a smart screen. In addition to the methods described in FIG. 3A and FIG. 3B, the two mobile phones may further implement double-channel screen mirroring by scanning a Quick Response (QR) code of the smart screen 10.

For example, after the user turns on the smart screen 10, as shown in FIG. 8A, a QR code 101 may be displayed on the smart screen 10, and the user may scan the QR code 101 through a scan button 40 of the smart screen application on the mobile phone 20 and the mobile phone 30, to implement a connection to the smart screen 10. Optionally, the scan button 40 may be in an upper-right corner region of the running interface of the smart screen application displayed after the user taps the smart screen application, for example, an operation guide interface 603 shown in FIG. 6C, an operation guide interface 604 shown in FIG. 6D, and an upper-right corner region of an operation guide interface 605 shown in FIG. 6E. This is not limited in this embodiment of this disclosure.

After the user scans the QR code 101 with the mobile phone 20, in response to a scanning operation of the user, a reminder window 102 shown in FIG. 8B may be displayed on the smart screen 10, and the reminder window is for reminding the user whether to connect to the device 20. The reminder window further includes a "connect" button and a "cancel" button. After the user selects the "connect" button, a connection between the mobile phone 20 and the smart screen 10 can be implemented, and a picture of the mobile phone 20 can be mirrored and displayed on the smart screen.

Similarly, the user may further perform a same operation through the mobile phone 30, and also mirror a picture of the mobile phone 30 to the smart screen 10 for display. Details are not described herein again.

Optionally, the QR code 101 of the smart screen 10 may be displayed in any region of the display screen of the smart screen 10 in different sizes or zoom ratios, for example, displayed in any position such as an upper left corner, a lower left corner, an upper right corner, or a lower right corner of the smart screen in a manner of a smaller icon, and the QR code 101 does not block home page content of the smart screen displayed in the middle of the display screen.

Alternatively, the QR code 101 of the smart screen 10 may be invoked by a path such as smart screen Settings>General>Smart screen control, or may be displayed on the display screen of the smart screen based on a path such as smart screen Home>General>smart double mirroring>QR code shown in FIG. 7 and a view operation of the user. This is not limited in this embodiment of this disclosure.

It should be understood that the QR code 101 of the smart screen 10 may include information such as a device identifier of the smart screen, or may further include information such as a data transmission manner in a mirroring process of the mobile phone and the smart screen. Information content included in the QR code is not limited in this embodiment of this disclosure.

In addition to the processes in FIG. 6A to FIG. 8B described above, the smart double mirroring process of the smart screen may be implemented. In addition, an operable portal may be provided in the setting application of the mobile phone and the smart screen, to implement a double mirroring process from the two mobile phones to the smart screen. Details are not described in this embodiment of this disclosure.

According to the foregoing plurality of processes of mirroring of the two mobile phone pictures to the smart screen, both pictures of the mobile phone 20 and the mobile phone 30 may be mirrored and displayed on the smart screen 10.

With reference to FIG. 1 to FIG. 8B, the double-channel screen mirroring method is described in the foregoing embodiments from a user interaction layer. With reference to FIG. 8A and FIG. 8B, a double-channel screen mirroring method provided in embodiments of this disclosure is described below from a software implementation policy layer. It should be understood that the method may be implemented in an electronic device such as the mobile phone or the smart screen that includes the positioning component shown in FIG. 4 or FIG. 5.

FIG. 9 is a schematic flowchart of an example of a double-channel screen mirroring method according to an embodiment of this disclosure. A double-channel screen mirroring scenario between a mobile phone and a smart screen is used as an example. As shown in FIG. 9, the method 900 may be applied to an electronic device such as a smart screen. The method 900 includes the following steps.

910: The electronic device displays, based on the first screen-mirroring data sent by the first source device and the second screen-mirroring data sent by the second source device, the mirrored picture corresponding to the first source device in the first region of the display screen, and displays the mirrored picture corresponding to the second source device in the second region of the display screen. In the first reference direction, the first source device and the second source device have the first relative position relationship, and the first region and the second region also have the first relative position relationship.

For example, as shown in FIG. 1, the electronic device may be the smart screen 10, and the first source device and the second source device may be a to-be-mirrored mobile phone 20 and a to-be-mirrored mobile phone 30. It should be understood that types of the first source device, the second source device, and the electronic device are not limited in this embodiment of this disclosure.

920: When the first source device and the second source device change from the first relative position relationship to the second relative position relationship, the electronic device switches the first region to displaying the mirrored picture corresponding to the second source device, and switches the second region to displaying the mirrored picture corresponding to the first source device.

It should be understood that the second relative position relationship is different from the first relative position relationship.

In a possible implementation, that the first source device and the second source device have the first relative position relationship, and that the first region and the second region also have the first relative position relationship includes: in the first reference direction, the first source device is located on the left side of the second source device, and the first region is located on the left side of the second region; and that the first source device and the second source device have the second relative position relationship includes: in the first reference direction, the first source device is located on the right side of the second source device.

Alternatively, in other words, the first relative position relationship indicates that in the first reference direction, the first source device is located on the left side of the second source device, and the first region is located on the left side of the second region, and the second relative position relationship indicates that in the first reference direction, the first source device is located on the right side of the second source device, and the first region is located on the right side of the second region. Alternatively, the first relative position relationship indicates that in the first reference direction, the first source device is located on the right side of the second source device, and the first region is located on the right side of the second region, and the second relative position relationship indicates that in the first reference direction, the first source device is located on the left side of the second source device, and the first region is located on the left side of the second region.

For example, as shown in FIG. 2A, in the reference direction shown by the black arrow, the smart screen 10 may determine that the mobile phone 20 is located on the left side of the mobile phone 30. In this way, the smart screen 10 determines that the region 10-1 for displaying the mirrored picture of the mobile phone 20 is located on the left side of the region 10-2 for displaying the mirrored picture of the mobile phone 30, and finally displays the mirrored picture, as shown in FIG. 2A. As shown in FIG. 2B, positions of the mobile phone 20 and the mobile phone 30 change. That is, the mobile phone 20 changes from being located on the left side of the mobile phone 30 to being located on the right side of the mobile phone 30. In this embodiment of this disclosure, when positions of the two mobile phones change, the display region 10-1 and the display region 10-2 of the display screen of the smart screen 10 can be automatically switched. In other words, as shown in FIG. 2B, the display region 10-2 for displaying the video play interface of the mobile phone 30 is switched to the left side of the display screen, and the display region 10-1 for displaying the game interface of the mobile phone 20 is switched to the right side of the display screen.

Alternatively, as shown in FIG. 3A, in the reference direction shown by the black arrow, the smart screen 10 may determine that the mobile phone 20 is located on the left side of the mobile phone 30, and the smart screen 10 finally displays a double-mirrored picture as shown in FIG. 2A. As shown in FIG. 3B, positions of the mobile phone 20 and the mobile phone 30 change. That is, the mobile phone 20 changes from being located on the left side of the mobile phone 30 to being located on the right side of the mobile phone 30. In this embodiment of this disclosure, when positions of the two mobile phones change, the display region 10-1 and the display region 10-2 of the display screen of the smart screen 10 can be automatically switched. In other words, as shown in FIG. 2B, the display region 10-2 for displaying the video playback interface of the mobile phone 30 is switched to the left side of the display screen, and the display region 10-1 for displaying the game interface of the mobile phone 20 is switched to the right side of the display screen.

In another possible implementation, the electronic device includes the first audio device and the second audio device. When the first screen-mirroring data includes the audio data corresponding to the first source device, and the second screen-mirroring data includes the audio data corresponding to the second source device, the electronic device plays, based on the audio data corresponding to the first source device and the audio data corresponding to the second source device through the first audio device and/or the second audio device, the audio corresponding to the first source device and/or the audio corresponding to the second source device.

Optionally, when the first source device and the second source device have the first relative position relationship, the electronic device plays, through the first audio device, the audio corresponding to the first source device, and plays, through the second audio device, the audio corresponding to the second source device. When detecting that the first source device and the second source device change from the first relative position relationship to the second relative position relationship, the electronic device may switch the first audio device to play the audio corresponding to the second source device, and switch the second audio device to play the audio corresponding to the first source device.

For example, as shown in FIG. 2A, in the reference direction shown by the black arrow, the smart screen 10 may determine that the mobile phone 20 is located on the left side of the mobile phone 30. In this case, the smart screen 10 finally displays a mirrored picture as shown in FIG. 2A, and plays the audio of the mobile phone 20 through the left audio device. As shown in FIG. 2B, positions of the mobile phone 20 and the mobile phone 30 change. That is, when the mobile phone 20 changes from being located on the left side of the mobile phone 30 to being located on the right side of the mobile phone 30, the display region 10-1 and the display region 10-2 of the display screen of the smart screen 10 may be automatically switched, and the audio of the mobile phone 20 is played through the right audio device.

In still another possible implementation, the electronic device, the first source device, and the second source device each include a positioning component. The electronic device may determine a relative position between the first source device and the second source device based on the positioning component of the electronic device, the positioning component of the first source device, and the positioning component of the second source device. The positioning component includes at least one of a BLUETOOTH positioning chip, a UWB positioning chip, a WI-FI positioning component, an infrared positioning component, or an ultrasonic positioning component.

The indoor BLUETOOTH positioning technology may be implemented based on a BLUETOOTH 5.1 transmission capability. BLUETOOTH positioning may be performed based on a radio technology of short-distance communication between electronic devices. The smart screen 10, the mobile phone 20, and the mobile phone 30 may be used as BLUETOOTH gateways, and positioning is implemented based on signal strength between the BLUETOOTH gateways. Generally, BLUETOOTH positioning within 10 meters is relatively accurate.

In the WI-FI positioning technology, an RSSI between the smart screen 10 and the mobile phone 20 and an RSSI between the smart screen 10 and the mobile phone 30 may be determined based on WI-FI communication, and a distance between the smart screen 10 and the mobile phone 20 and a distance between the smart screen 10 and the mobile phone 30 are measured based on the received signal strength, to perform positioning calculation, and further determine relative positions between the smart screen 10 and the mobile phone 20 and between the smart screen 10 and the mobile phone 30.

The UWB positioning technology is also one of indoor positioning technologies. The positioning technology has strong penetration, low power consumption, high security, and high positioning accuracy. The UWB positioning technology is mainly based on a UWB chip to achieve high-precision indoor and outdoor positioning. The UWB chip may provide a time stamp for receiving and sending a data frame, which is a basic condition for performing a distance measurement between two points. Simply speaking, a distance between two nodes is measured by calculating a TOF of a data frame in the air * the speed of light=a data flight distance. Alternatively, a time difference at which a data frame arrives at different devices (also referred to as a TDOA direction-finding method) is measured. Details are not described in embodiments of this disclosure.

In a technology such as an infrared ray and an ultrasonic wave, a distance between devices may be calculated based on an infrared ray, an ultrasonic wave, or the like between the smart screen 10 and the mobile phone 20 or the mobile phone 30, and based on an arrival time of the infrared ray, the ultrasonic wave, or the like between devices. For example, the mobile phone 20 sends an ultrasonic wave, and the smart screen 10 uses a MIC to determine a sound phase difference to determine a relative position. Details are not described herein again.

According to the foregoing method, the smart screen can dynamically switch between the double mirrored pictures on the display screen based on the position change of the mobile phones, and implement adaptive switching between the mirrored pictures of the two mobile phones based on the position change of the mobile phones. Audio play can also change with a change of a display region on the display screen, and a sound and picture can be switched simultaneously, thereby providing more user-friendly experience.

FIG. 10 is a schematic flowchart of another example of a double-channel screen mirroring method according to an embodiment of this disclosure. As shown in FIG. 10, the method 1000 may be applied to an electronic device such as a smart screen, and the method 1000 includes the following steps.

1010: The electronic device receives the first screen-mirroring data sent by the first source device and the second screen-mirroring data sent by the second source device.

1020: The electronic device determines the relative position between the first source device and the second source device.

In a possible implementation, the electronic device, the first source device, and the second source device each include a positioning component. The electronic device determines the relative position between the first source device and the second source device based on the positioning components of the electronic device, the first source device, and the second source device. For details, refer to the foregoing descriptions. Details are not described herein again.

1030: The electronic device displays, based on the first screen-mirroring data, the second screen-mirroring data, and the relative position of the first source device and the second source device, a picture of the first source device in the first region of the display screen, and displays a picture of the second source device in the second region of the display screen.

In a smart double mirroring scenario, when displaying, through initialization, the mirrored pictures corresponding to the two mobile phones, the smart screen 10 may determine, based on the relative position between the two mobile phones, the region 10-1 for displaying the mirrored picture of the mobile phone 20 and the region 10-2 for displaying the mirrored picture of the mobile phone 30.

Optionally, the first region and the second region are different regions on the display screen, and in a same reference direction, the relative position between the first region and the second region on the display screen are consistent with a relative position between the first source device and the second source device.

In a possible implementation, that the relative position between the first region and the second region on the display screen are consistent with a relative position between the first source device and the second source device includes any one of the following situations. In a same reference direction, the first region is located on the left side of the second region, and the first source device is located on the left side of the second source device; alternatively, in a same reference direction, the first region is located on the right side of the second region, and the first source device is located on the right side of the second source device.

For example, as shown in FIG. 2A, the first region 10-1 is for displaying the picture of the mobile phone 20, and the second region 10-2 is for displaying the picture of the mobile phone 30. A direction facing the smart screen by the user is used as a reference direction, and the mobile phone 20 is located on the left side of the mobile phone 30. When the mobile phone 20 and the mobile phone 30 are mirrored to the smart screen 10, the first region 10-1 for displaying the mobile phone 20 is also correspondingly located on a left region of the second region 10-2 for displaying the mobile phone 30.

Alternatively, for example, as shown in FIG. 3A, the first region 10-1 is for displaying a landscape picture of the mobile phone 20, and the second region 10-2 is for displaying a portrait picture of the mobile phone 30. A direction facing the smart screen by the user is used as a reference direction, and the mobile phone 20 is located on the left side of the mobile phone 30. When the mobile phone 20 and the mobile phone 30 are mirrored to the smart screen 10, the first region 10-1 for displaying the portrait picture of the mobile phone 20 is also correspondingly located in the left region of the second region 10-2 for displaying the landscape picture of the mobile phone 30.

1040: When the relative position between the first source device and the second source device change, the electronic device switches the first region to displaying the picture of the second source device, and switches the second region to displaying the picture of the first source device.

For example, as shown in FIG. 2B, a direction facing the smart screen by the user is used as a reference direction. When positions of the mobile phone 20 and the mobile phone 30 change, that is, the mobile phone 20 moves to the right side of the mobile phone 30, correspondingly, positions of the first region 10-1 of the smart screen 10 that is for displaying the mobile phone 20 and the second region 10-2 of the smart screen 10 that is for displaying the mobile phone 30 are switched. In other words, the first region 10-1 of the smart screen 10 that is for displaying the mobile phone 20 is correspondingly switched to a right region of the display screen.

Alternatively, for example, as shown in FIG. 3B, a direction facing the smart screen by the user is used as a reference direction. When positions of the mobile phone 20 and the mobile phone 30 change, that is, the mobile phone 20 moves to the right side of the mobile phone 30, correspondingly, the positions of the first region 10-1 of the smart screen 10 that is for displaying a portrait picture of the mobile phone 20 and the second region 10-2 of the smart screen 10 that is for displaying a landscape picture of the mobile phone 30 are switched. In other words, the first region 10-1 of the smart screen 10 that is for displaying the mobile phone 20 is correspondingly switched to the right region of the display screen, and still maintains a landscape mode. The second region 10-2 is correspondingly switched to the left region of the display screen, and still maintains a portrait mode.

In another possible implementation, the electronic device includes the first audio device and the second audio device. The electronic device may further receive audio data of the first source device sent by the first source device and audio data of the second source device sent by the second source device; and play, based on the audio data of the first source device and the audio data of the second source device through the first audio device and/or the second audio device, the audio of the first source device and/or the audio of the second source device.

It should be understood that the smart screen 10 may include at least one speaker, for example, one speaker on a left side and one speaker on a right side. In a smart double mirroring process, the left and right speakers may separately play audio of two mobile phones, or the user may set, through a remote control, that only the left speaker plays audio of the mobile phone 20, and the mobile phone 30 is in a muted state. This is not limited in this embodiment of this disclosure.

In still another possible implementation, when the electronic device plays the audio of the first source device through the first audio device, plays the audio of the second source device through the second audio device, and detects that the relative position between the first source device and the second source device change, the electronic device switches the first audio device to play the audio of the second source device, and switches the second audio device to play the audio of the first source device.

For example, as shown in FIG. 2B or FIG. 3B, a direction facing the smart screen by the user is used as a reference direction. When the positions of the mobile phone 20 and the mobile phone 30 change, that is, the mobile phone 20 moves to the right side of the mobile phone 30, correspondingly, the positions of the first region 10-1 of the smart screen 10 that is for displaying the mobile phone 20 and the second region 10-2 of the smart screen 10 that is for displaying the mobile phone 30 are switched, and the audio data of the mobile phone 20 is switched from the left speaker to the right speaker for playing.

According to the foregoing method, the smart screen can dynamically switch between double-mirrored pictures on the display screen based on a position change of the mobile phone, so that the mirrored pictures of the two mobile phones can be adaptively switched with the position of the mobile phone. This can prevent the user from using a remote control to switch between the mirrored pictures, thereby simplifying user operations. In addition, in this process, an original landscape/portrait display mode of the mobile phone can be maintained, and user experience closer to the mobile phone is provided. In addition, audio play may also change with a change of a display region on the display screen, and simultaneous switching of a sound and a picture may provide more user-friendly experience.

It may be understood that, to implement the foregoing functions, the electronic device includes corresponding hardware and/or software modules for performing the functions. In combination with example algorithm steps described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this disclosure.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in embodiments, division into the modules is an example, and is merely logical function division. During actual implementation, another division manner may be used.

When each function module is obtained through division based on each corresponding function, the electronic device may include a display unit, a detection unit, and a processing unit. The display unit, the detection unit, and the processing unit cooperate with each other to implement the technical process described in this specification.

It should be noted that all related content of the steps in the foregoing method embodiments may be cited in function description of corresponding functional modules. Details are not described herein again.

The electronic device provided in this embodiment is configured to perform the foregoing double-channel screen mirroring method, and therefore can achieve a same effect as the foregoing implementation method.

When an integrated unit is used, the electronic device may include a processing module, a storage module, and a communication module. The processing module may be configured to control and manage an action of the electronic device, for example, may be configured to support the electronic device in performing the steps described above. The storage module may be configured to support the electronic device to store program code, data, and the like. The communication module may be configured to support communication between the electronic device and another device.

The processing module may be a processor or a controller. The processor may implement or execute various example logical blocks, modules, and circuits described with reference to content disclosed in this disclosure. The processor may alternatively be a combination for implementing a computing function, for example, a combination including one or more microprocessors or a combination of a digital signal processor (DSP) and a microprocessor. The storage module may be a memory. The communication module may be a device, for example, a radio frequency circuit, a BLUETOOTH chip, or a WI-FI chip, that interacts with another electronic device.

In an embodiment, when the processing module is a processor and the storage module is a memory, the electronic device in this embodiment may be a device with the structure shown in FIG. 4.

An embodiment further provides a computer-readable storage medium. The computer-readable storage medium stores computer instructions. When the computer instructions are run on an electronic device, the electronic device is enabled to perform the foregoing related method steps to implement the double-channel screen mirroring method in the foregoing embodiments.

An embodiment further provides a computer program product. When the computer program product is run on a computer, the computer is enabled to perform the foregoing related steps, to implement the double-channel screen mirroring method in the foregoing embodiments.

In addition, an embodiment of this disclosure further provides an apparatus. The apparatus may be a chip, a component, or a module. The apparatus may include a processor and a memory that are connected to each other. The memory is configured to store computer executable instructions. When the apparatus runs, the processor may execute the computer executable instructions stored in the memory, to enable the chip to perform the double-channel screen mirroring method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to other technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, for example, a USB flash drive, a removable hard disk, a read-only memory (ROM), a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
    receiving, by an electronic device and from a first source device, first screen-mirroring data, wherein the first screen-mirroring data comprises first audio data corresponding to the first source device;
    receiving, by the electronic device and from a second source device, second screen-mirroring data, wherein the second screen-mirroring data comprises second audio data corresponding to the second source device, and wherein the first source device and the second source device have a first relative position relationship;
    displaying, by the electronic device and based on the first screen-mirroring data, a first mirrored picture corresponding to the first source device in a first region of a display screen of the electronic device;
    displaying, by the electronic device and based on the second screen-mirroring data, a second mirrored picture corresponding to the second source device in a second region of the display screen of the electronic device, wherein the first region and the second region have the first relative position relationship;
    playing, by the electronic device, the first audio data through a first audio device;
    playing, by the electronic device, the second audio data through a second audio device;
    detecting, by the electronic device and based on positioning components of the electronic device, the first source device, and the second source device, that the first source device and the second source device change from the first relative position relationship to a second relative position relationship; and
    when detecting that the first source device and the second source device change from the first relative position relationship to the second relative position relationship:
        automatically switching, by the electronic device, the first region from displaying the first mirrored picture to displaying the second mirrored picture and the second region from displaying the second mirrored picture to displaying the first mirrored picture;
        switching, by the electronic device, the first audio device to play the second audio data; and
        switching, by the electronic device, the second audio device to play the first audio data.

2. The method of claim 1, further comprising obtaining positions of the first source device and the second source device, wherein displaying the first mirrored picture and the second mirrored picture comprises displaying, based on the positions, the first mirrored picture in the first region and the second mirrored picture in the second region.

3. The method of claim 1, further comprising obtaining the first relative position relationship between the first source device and the second source device, wherein displaying the first mirrored picture and the second mirrored picture comprises displaying, based on the first relative position relationship, the first mirrored picture in the first region and the second mirrored picture in the second region.

4. The method of claim 1, wherein when the first relative position relationship comprises the first source device being located on a left side of the second source device in a first reference direction, the method further comprises displaying the first region on the left side of the second region.

5. The method of claim 1, wherein when the second relative position relationship comprises the first source device being located on a right side of the second source device in a first reference direction, the method further comprises displaying the first region on the right side of the second region.

6. The method of claim 1, wherein the first screen-mirroring data comprises image data corresponding to the first source device.

7. The method of claim 1, wherein the second screen-mirroring data comprises image data corresponding to the second source device.

8. The method of claim 1, wherein the positioning components comprise a first positioning component of the first source device, a second positioning component of the second source device, and a third positioning component of the electronic device, wherein the method further comprises obtaining, based on the first positioning component of the first source device, the second positioning component of the second source device, and the third positioning component of the electronic device, the first relative position relationship and the second relative position relationship, and wherein the first positioning component, the second positioning component, and the third positioning component comprise a BLUETOOTH positioning chip, an ultra-wideband (UWB) positioning chip, a WI-FI positioning component, an infrared positioning component, or an ultrasonic positioning component.

9. The method of claim 1, wherein displaying the first mirrored picture in the first region and displaying the second mirrored picture in the second region comprise displaying the first mirrored picture and the second mirrored picture in non-overlapping regions of the display screen of the electronic device.

10. An apparatus, comprising:
    a memory configured to store instructions; and
    one or more processors coupled to the memory and configured to execute the instructions to:
        receive, from a first source device, first screen-mirroring data, wherein the first screen-mirroring data comprises first audio data corresponding to the first source device;
        receive, from a second source device, second screen-mirroring data, wherein the second screen-mirroring data comprises second audio data corresponding to the second source device, and wherein the first source device and the second source device have a first relative position relationship;
        display, based on the first screen-mirroring data, a first mirrored picture corresponding to the first source device in a first region of a display screen of the apparatus;
        display, based on the second screen-mirroring data, a second mirrored picture corresponding to the second source device in a second region of the display screen of the apparatus, wherein the first region and the second region have the first relative position relationship;
        play the first audio data through a first audio device;

play the second audio data through a second audio device;

detect, based on positioning components of the apparatus, the first source device, and the second source device, that the first source device and the second source device change from the first relative position relationship to a second relative position relationship; and when detecting that the first source device and the second source device change from the first relative position relationship to the second relative position relationship:

automatically switch the first region from displaying the first mirrored picture to displaying the second mirrored picture and the second region from displaying the second mirrored picture to displaying the first mirrored picture;

switch the first audio device to play the second audio data; and switch the second audio device to play the first audio data.

11. The apparatus of claim 10, wherein the first screen-mirroring data comprises image data corresponding to the first source device.

12. The apparatus of claim 10, wherein the second screen-mirroring data comprises image data corresponding to the second source device.

13. A computer program product comprising instructions stored on a non-transitory computer readable medium that, when executed by one or more processors, cause an apparatus to:

receive, from a first source device, first screen-mirroring data, wherein the first screen-mirroring data comprises first audio data corresponding to the first source device;

receive, from a second source device, second screen-mirroring data, wherein the second screen-mirroring data comprises second audio data corresponding to the second source device, and wherein the first source device and the second source device have a first relative position relationship;

display, based on the first screen-mirroring data, a first mirrored picture corresponding to the first source device in a first region of a display screen of the apparatus;

display, based on the second screen-mirroring data, a second mirrored picture corresponding to the second source device in a second region of the display screen of the apparatus, wherein the first region and the second region have the first relative position relationship;

play the first audio data through a first audio device;

play the second audio data through a second audio device;

detect, based on positioning components of the apparatus, the first source device, and the second source device, that the first source device and the second source device change from the first relative position relationship to a second relative position relationship; and when detecting that the first source device and the second source device change from the first relative position relationship to the second relative position relationship:

automatically switch the first region from displaying the first mirrored picture to displaying the second mirrored picture and the second region to displaying from displaying the second mirrored picture to the first mirrored picture corresponding to the first source device;

switch the first audio device to play the second audio data; and switch the second audio device to play the first audio data.

14. The computer program product of claim 13, wherein the first screen-mirroring data comprises first image data corresponding to the first source device, and wherein the second screen-mirroring data comprises second image data corresponding to the second source device.

15. The computer program product of claim 13, wherein the instructions, when executed by the one or more processors, further cause the apparatus to:

obtain positions of the first source device and the second source device; and display, based on the positions, the first mirrored picture in the first region and the second mirrored picture in the second region.

16. The computer program product of claim 13, wherein the instructions, when executed by the one or more processors, further cause the apparatus to:

obtain the first relative position relationship between the first source device and the second source device; and display, based on the first relative position relationship, the first mirrored picture in the first region and the second mirrored picture in the second region.

17. The computer program product of claim 13, wherein when the first relative position relationship comprises the first source device being located on a left side of the second source device in a first reference direction, the instructions, when executed by the one or more processors, further cause the apparatus to display the first region on the left side of the second region.

18. The computer program product of claim 13, wherein when the second relative position relationship comprises the first source device being located on a right side of the second source device in a first reference direction, the instructions, when executed by the one or more processors, further cause the apparatus to display the first region on the right side of the second region.

19. The computer program product of claim 13, wherein the first screen-mirroring data comprises image data corresponding to the first source device.

20. The computer program product of claim 13, wherein the positioning components comprise a first positioning component of the first source device, a second positioning component of the second source device, and a third positioning component of the apparatus, wherein the instructions, when executed by the one or more processors, further cause the apparatus to obtain, based on the first positioning component of the first source device, the second positioning component of the second source device, and the third positioning component of the apparatus, the first relative position relationship and the second relative position relationship, and wherein the first positioning component, the second positioning component, and the third positioning component comprise a BLUETOOTH positioning chip, an ultra-wideband (UWB) positioning chip, a WI-FI positioning component, an infrared positioning component, or an ultrasonic positioning component.

21. The computer program product of claim 13, wherein the instructions, when executed by the one or more processors, further cause the apparatus to display the first mirrored picture and the second mirrored picture in non-overlapping regions of the display screen of the apparatus.

* * * * *